(12) United States Patent
Choi et al.

(10) Patent No.: US 11,442,684 B2
(45) Date of Patent: Sep. 13, 2022

(54) ELECTRONIC DEVICE AND METHOD OF DISPLAYING CONTENT THEREON

(71) Applicant: SAMSUNG ELECTRONICS CO., LTD., Suwon-si (KR)

(72) Inventors: Seonghoon Choi, Suwon-si (KR); Yongjin Kwon, Suwon-si (KR); Jeongwon Yang, Suwon-si (KR); Byungseok Jung, Suwon-si (KR); Il Jung, Suwon-si (KR); Jinwan An, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/471,242

(22) Filed: Sep. 10, 2021

(65) Prior Publication Data

US 2021/0405953 A1    Dec. 30, 2021

Related U.S. Application Data

(63) Continuation of application No. 16/794,600, filed on Feb. 19, 2020, now Pat. No. 11,231,895.

(30) Foreign Application Priority Data

Feb. 19, 2019    (KR) .......................... 10-2019-0018906

(51) Int. Cl.
*G06T 3/40* (2006.01)
*G06F 3/14* (2006.01)
*G06F 3/04845* (2022.01)

(52) U.S. Cl.
CPC ........ *G06F 3/1423* (2013.01); *G06F 3/04845* (2013.01); *G06T 3/40* (2013.01)

(58) Field of Classification Search
None
See application file for complete search history.

(56) References Cited

U.S. PATENT DOCUMENTS 10,056,059 B2    8/2018  Barnes
2012/0280924 A1   11/2012  Kim et al.
(Continued)

FOREIGN PATENT DOCUMENTS

KR    10-2014-0090921    7/2014
KR    10-2016-0055646    5/2016
(Continued)

OTHER PUBLICATIONS

U.S. Appl. No. 16/794,600, filed Feb. 19, 2020.
(Continued)

*Primary Examiner* — Nicholas R Wilson
(74) *Attorney, Agent, or Firm* — Nixon & Vanderhye P.C.

(57) ABSTRACT

An electronic device may include: a foldable housing; at least one sensor; a first display having a first size and a first pixel density; a second display having a second size and a second pixel density; a processor; and a memory. The memory may store instructions that, when executed, cause the processor to control the electronic device to: display at least one first surface image generated based on the window having the first size through the first display; change the size of the window to a third size based on information associated with the first display and the second display in response to detecting a first event through the at least one sensor based on the at least one first surface image being displayed; and display at least one second surface image generated based on the window, of which the size has been changed to the third size, through the second display.

20 Claims, 13 Drawing Sheets

(56) References Cited

U.S. PATENT DOCUMENTS

| | | |
|---|---|---|
| 2013/0057567 A1 | 3/2013 | Frank |
| 2014/0101576 A1 | 4/2014 | Kwak et al. |
| 2015/0338888 A1 | 11/2015 | Kim et al. |
| 2016/0132074 A1 | 5/2016 | Kim et al. |
| 2016/0188162 A1 | 6/2016 | Lee |
| 2017/0250460 A1 | 8/2017 | Shin et al. |
| 2018/0039408 A1 | 2/2018 | Cheong |
| 2018/0198896 A1 | 7/2018 | Kang et al. |

FOREIGN PATENT DOCUMENTS

| | | |
|---|---|---|
| KR | 10-2018-0027467 | 3/2018 |
| KR | 10-2018-0108271 A | 10/2018 |
| KR | 10-1904143 | 10/2018 |

OTHER PUBLICATIONS

International Search Report and Written Opinion dated Jun. 16, 2020 in counterpart International Patent Application No. PCT/KR2020/002418.

European Extended Search Report dated Nov. 9, 2021 for EP Application No. 20758609.0.

ELECTRONIC DEVICE AND METHOD OF DISPLAYING CONTENT THEREON

CROSS-REFERENCE TO RELATED APPLICATION

This application is a Continuation of U.S. application Ser. No. 16/794,600, filed Feb. 19, 2020, which claims priority to KR 10-2019-0018906, filed Feb. 19, 2019, the entire contents of which are all hereby incorporated herein by reference in their entireties.

BACKGROUND

1) Field

The disclosure relates to an electronic device and a method of displaying content thereon.

2) Description of Related Art

Recently, with the development of display-related technology, electronic devices having a flexible display have been developed. The flexible display may be used not only in the form of a plane, but also in a three-dimensional form deformed due to the flexibility thereof. For example, the flexible display may be deformed and used in a flexible, rollable, or foldable form.

An electronic device having a flexible display may continuously provide information to a user through an additional display even when the state (or shape) of the electronic device is switched such that the flexible display is covered. For example, when the state of the electronic device is switched from an unfolded state to a folded state while a content corresponding to the application is being provided through the flexible display, the content corresponding to the application may be continuously provided through the additional display.

However, when the pixel density of the flexible display (e.g., dots per inch (DPI) or pixels per inch (PPI)) may differ from the pixel density of the additional display and the application may not support changing the pixel density, since the application is re-executed when providing the content corresponding to the application, it is impossible to continuously provide the content. Accordingly, even if the pixel density of the flexible display is different from the pixel density of the additional display and the application does not support changing the pixel density, a solution capable of continuously providing the content corresponding to the application through the additional display may be required.

The above information is presented as background information only to assist with an understanding of the disclosure. No determination has been made, and no assertion is made, as to whether any of the above might be applicable as prior art with regard to the disclosure.

SUMMARY

Embodiments of the disclosure provide a method and device for continuously switching and providing contents corresponding to applications between displays in an electronic device including a flexible display and an additional display, even when the pixel densities of the displays are different from each other and the applications do not support changing the pixel densities.

An electronic device according to various example embodiments may include: a foldable housing including: a hinge, a first housing connected to the hinge, and including a first face oriented in a first direction, and a second face oriented in a second direction opposite the first direction, and a second housing connected to the hinge and including a third face oriented in a third direction, and a fourth face oriented in a fourth direction opposite the third direction, the second housing being configured to be folded with the first housing about the hinge, wherein, in a folded state, the first face faces the third face, and in a fully unfolded state, the third direction is the same as the first direction; at least one sensor disposed inside the foldable housing; a first display extending from the first face to the third face and defining the first face and the third face, the first display having a first size and a first pixel density; a second display defining the second face and having a second size and a second pixel density different from the first pixel density; a processor disposed inside the first housing or the second housing, and operatively connected to the at least one sensor, the first display, and the second display; and a memory operatively connected to the processor. The memory may store instructions that, when executed, cause the processor to control the electronic device to: display at least one first surface image generated based on a window having the first size through the first display; change the size of the window to a third size different from the first size and the second size based on information associated with the first display and information associated with the second display in response to detecting a first event through the at least one sensor based on the at least one first surface image being displayed through the first display; and display at least one second surface image generated based on the window, of which the size has been changed to the third size, through the second display.

According to various example embodiments, a method of displaying a content on an electronic device is provided, the electronic device including: a foldable housing including: a hinge, a first housing connected to the hinge, and including a first face oriented in a first direction, and a second face oriented in a second direction opposite the first direction, and a second housing connected to the hinge and including a third face oriented in a third direction, and a fourth face oriented in a fourth direction opposite the third direction, the second housing being configured to be folded with the first housing about the hinge, wherein, in a folded state, the first face faces the third face, and in a fully unfolded state, the third direction is the same as the first direction; at least one sensor disposed inside the foldable housing; a first display extending from the first face to the third face and defining the first face and the third face, the first display having a first size and a first pixel density; a second display defining the second face, the second display having a second size and a second pixel density different from the first pixel density; a processor disposed inside the first housing or the second housing, and operatively connected to the at least one sensor, the first display, and the second display; and a memory operatively connected to the processor. The method may include: displaying at least one first surface image generated based on the window having the first size through the first display; changing the size of the window to a third size different from the first size and the second size based on information associated with the first display and information associated with the second display in response to detecting a first event through the at least one sensor based on the at least one first surface image being displayed through the first display; and displaying at least one second surface image generated based on the window, of which the size has been changed to the third size, through the second display.

Various example embodiments are capable of providing seamless usability of applications by continuously switching and providing contents corresponding to applications between displays in an electronic device including a flexible display and an additional display even when the pixel densities of the displays are different from each other and the applications do not support changing the pixel densities.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
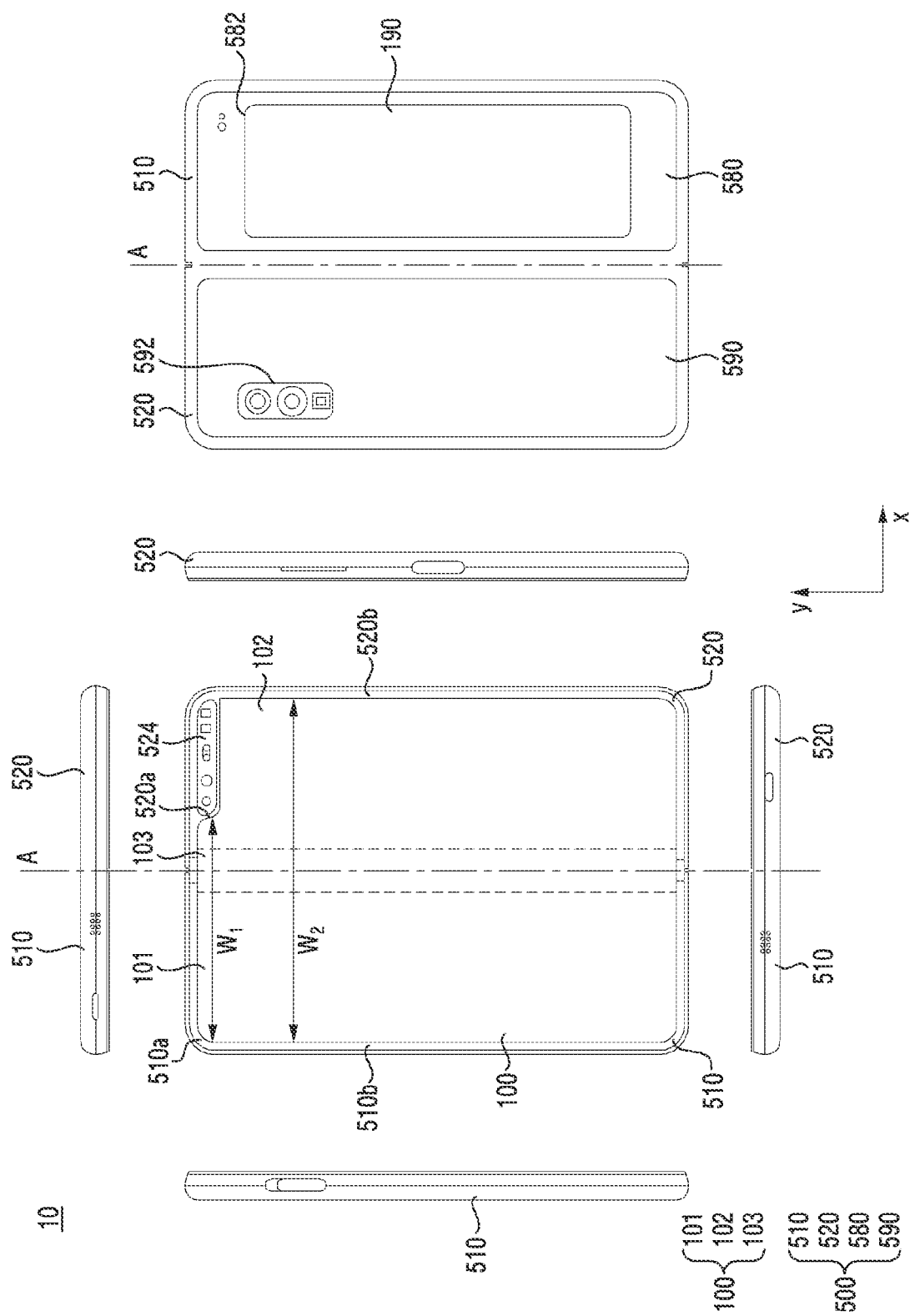
FIG. 1 is a diagram illustrating an example electronic device in an unfolded state according to various embodiments.

Hereinafter, various example embodiments of the disclosure will be described in greater detail with reference to the accompanying drawings. Although particular embodiments of the disclosure are illustrated in the drawings and described in the relevant detailed description, these embodiments are not intended to limit various embodiments of the disclosure to specific forms. For example, it will be apparent to those skilled in the art that the various example embodiments of the disclosure may be modified and changed in various ways.

Figure 2:
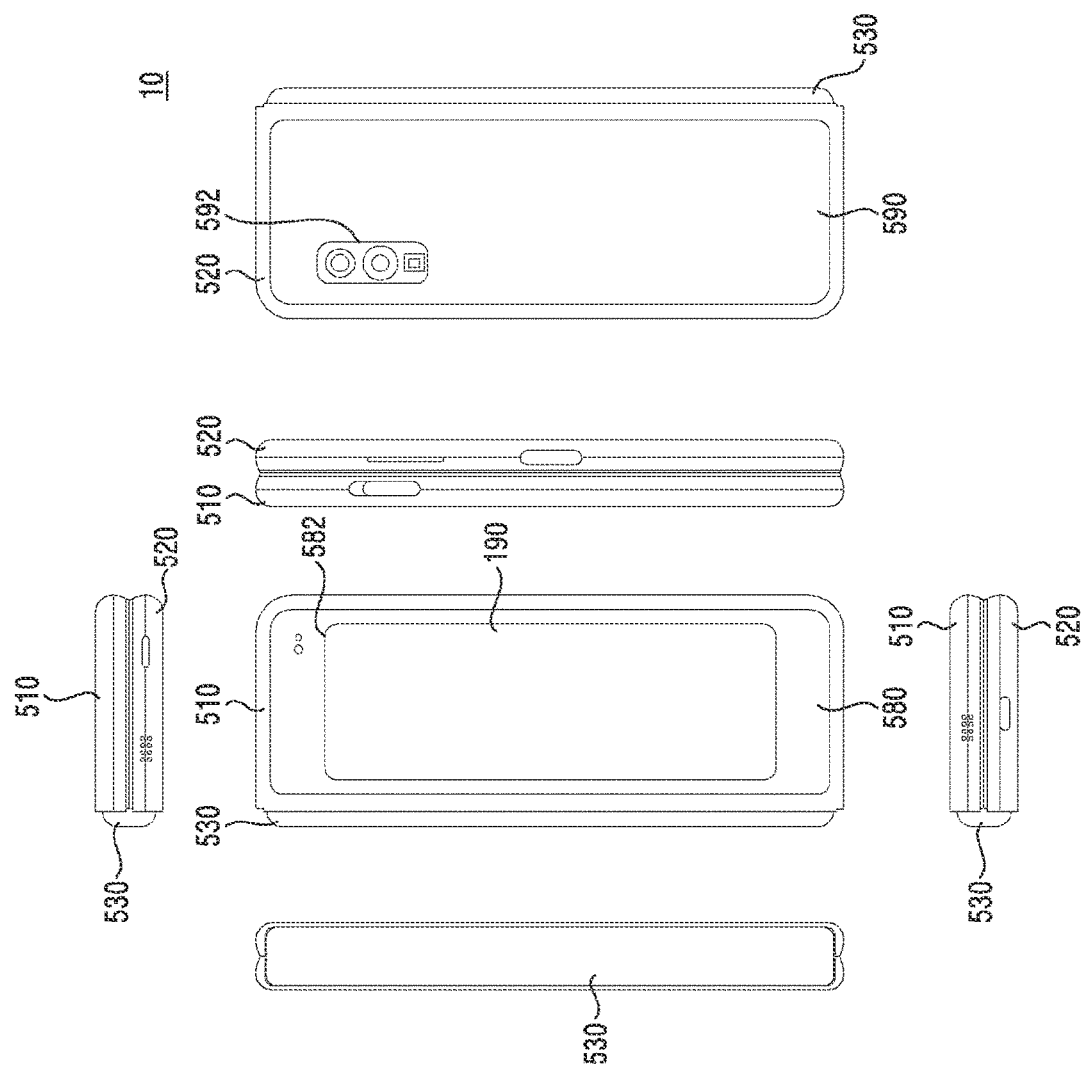
FIG. 2 is a diagram illustrating an example electronic device in a folded state according to various embodiments.

FIG. 1 is a diagram illustrating an example electronic device in an unfolded state according to various embodiments. FIG. 2 is a diagram illustrating an example electronic device in a folded state according to various embodiments.

Referring to FIGS. 1 and 2, in an embodiment, an electronic device 10 may include a foldable housing 500, a hinge cover 530 configured to cover the foldable portion of the foldable housing 300, and a flexible or foldable display 100 (hereinafter, simply referred to as a "display" 100) disposed in a space formed by the foldable housing 500. Herein, the face on which the display 100 is disposed is defined as a first face or the front face of the electronic device 10. In addition, the face opposite the front face is defined as a second face or the rear face of the electronic device 10. In addition, the face surrounding the space between the front face and the rear face is defined as a third face or the side face of the electronic device 10.

In an embodiment, the foldable housing 500 may include a first housing structure 510, a second housing structure 520 including a sensor area 524, a first rear cover 580, and a second rear cover 590. The foldable housing 500 of the electronic device 10 is not limited to the shape and assembly illustrated in FIGS. 1 and 2, but may be implemented by combinations and/or assemblies of other shapes or components. For example, in another embodiment, the first housing structure 510 and the first rear cover 580 may be integrally formed, and the second housing structure 520 and the second rear cover 590 may be integrally formed.

In the illustrated embodiment, the first housing structure 510 and the second housing structure 520 may be disposed on opposite sides about a folding axis (axis A), and may have generally symmetrical shapes about the folding axis A. As will be described later, the first housing structure 510 and the second housing structure 520 may have different angles or distances therebetween depending on whether the electronic device 10 is in the unfolded state, in the folded state, or in the intermediate state. In the illustrated state, the second housing structure 520 may further include the sensor area 524 in which various sensors are disposed. However, the first housing structure 510 and the second housing structure 520 may have mutually symmetrical shapes in other areas.

In an embodiment, as illustrated in FIG. 1, the first housing structure 510 and the second housing structure 520 may form together a recess that accommodates the display 100 therein. In the illustrated embodiment, due to the sensor area 524, the recess may have two or more different widths in a direction perpendicular to the folding axis A.

For example, the recess may have a first width $w_1$ between a first portion 510a parallel to the folding axis A in the first housing structure 510 and a first portion 520a formed at an edge of the sensor area 524 in the second housing structure 520, and a second width $w_2$ formed by a second portion 510b in the first housing structure 510 and a second portion 520b parallel to the folding axis A but not corresponding to the sensor area 524 in the second housing structure 520. In this case, the second width $w_2$ may be longer than the first width $w_1$. In other words, the first portion 510a of the first housing structure 510 and the first portion 520a of the second housing structure 520, which are asymmetric to each other, may form the first width $w_1$ of the recess, and the second portion 510b of the first housing structure 510 and the second portion 520b of the second housing structure 520, which are symmetric to each other, may form the second width $w_2$ of the recess. In an embodiment, the first portion 520a and the second portion 520b of the second housing structure 520 may have different distances from the folding axis A, respectively. The widths of the recess are not limited to the illustrated example. In various embodiments, the recess may have multiple widths due to the shape of the sensor area 524 and due to the asymmetric portions of the first housing structure 510 and the second housing structure 520.

In an embodiment, at least a portion of the first housing structure 510 and at least a portion of the second housing structure 520 may be formed of a metal material or a non-metal material having a rigidity of a level selected in order to support the display 100.

According to an embodiment, the sensor area 524 may be formed to have a predetermined area adjacent to one corner of the second housing structure 520. However, the arrangement, shape, and size of the sensor area 524 are not limited to those in the illustrated example. For example, in another embodiment, the sensor area 524 may be provided at another corner of the second housing structure 520 or in any area between the upper and lower end corners. In an embodiment, components embedded in the electronic device 10 to perform various functions may be exposed to the front face of the electronic device 10 through the sensor area 524 or one or more openings provided in the sensor area 524. In various embodiments, the components may include various types of sensors. The sensors may include at least one of, for example, a front camera, a receiver, or a proximity sensor.

The first rear cover 580 may be disposed on one side of the folding axis in the rear face of the electronic device, and may have, for example, a substantially rectangular periphery. The periphery may be enclosed by the first housing structure 501. Similarly, the second rear cover 590 may be disposed on the other side of the folding axis in the rear face of the electronic device, and the periphery of the second rear cover 590 may be enclosed by the second housing structure 520.

In the illustrated embodiment, the first rear cover 580 and the second rear cover 590 may have substantially symmetrical shapes about the folding axis (the axis A). However, the first rear cover 580 and the second rear cover 590 do not necessarily have mutually symmetrical shapes, and in another embodiment, the electronic device 10 may include the first rear cover 580 and the second rear cover 590 having various shapes. In a still another embodiment, the first rear cover 580 may be integrally formed with the first housing structure 510, and the second rear cover 590 may be integrally formed with the second housing structure 520.

In an embodiment, the first rear cover 580, the second rear cover 590, the first housing structure 510, and the second housing structure 520 may define a space in which various components (e.g., a printed circuit board or a battery) of the electronic device 10 may be arranged. In an embodiment, one or more components may be disposed or visually exposed on the rear face of the electronic device 10. For example, at least a portion of a sub-display 190 may be visually exposed through a first rear area 582 of the first rear cover 580. In another embodiment, one or more components or sensors may be visually exposed through a second rear area 592 of the second rear cover 590. In various embodiments, the sensors may include a proximity sensor and/or a rear camera.

Referring to FIG. 2, the hinge cover 530 may be disposed between the first housing structure 510 and the second housing structure 520 so as to cover internal components (e.g., the hinge structure). In an embodiment, the hinge cover 530 may be covered by a portion of the first housing structure 510 and a portion of the second housing structure 520, or may be exposed to the outside depending on whether the electronic device 10 is in the unfolded state (flat state) or in the folded state.

For example, as illustrated in FIG. 1, when the electronic device 10 is in the unfolded state, the hinge cover 530 may not be exposed by being covered by the first housing structure 510 and the second housing structure 520. As an example, as illustrated in FIG. 2, when the electronic device 10 is in the folded state (e.g., the fully folded state), the hinge cover 530 may be exposed to the outside between the first housing structure 510 and the second housing structure 520. As an example, when the first housing structure 510 and the second housing structure 520 are in the intermediate state in which the first housing structure 510 and the second housing structure 520 are folded to form a predetermined angle therebetween, the hinge cover 530 may be exposed to the outside between the first housing structure 310 and the second housing structure 320. In this case, however, the exposed area may be less than that in the fully folded state. In an embodiment, the hinge cover 530 may include a curved face.

The display 100 may be disposed in a space formed by the foldable housing 500. For example, the display 100 may be seated in the recess formed by the foldable housing 500, and may include most of the front face of the electronic device 10.

Accordingly, the front face of the electronic device 10 may include the display 100, and a portion of the first housing structure 510 and a portion of the second housing structure 520, which are adjacent to the display 100. In addition, the rear face of the electronic device 10 may include the first rear cover 580, a portion of the first housing structure 510 adjacent to the first rear cover 580, the second rear cover 590, and a portion of the second housing structure 520 adjacent to the second rear cover 590.

The display 100 may refer, for example, to a display in which at least one area is deformable into a planar face or a curved face. In an embodiment, the display 100 may include a folding area 103, a first area 101 disposed on one side of the folding area 103 (e.g., the left side of the folding area 103 illustrated in FIG. 1) and a second area 102 disposed on the other side of the folding area 103 (e.g., the right side of the folding area 103 illustrated in FIG. 1).

The area division of the display 100 illustrated in FIG. 1 is illustrative, and the display 100 may be divided into multiple areas (e.g., four or more areas or two areas) depending on the structures or functions thereof. For example, in the embodiment illustrated in FIG. 1, the areas of the display 100 may be divided by the folding area 103 or the folding axis (the axis A) extending parallel to the y axis. However, in another embodiment, the areas of the display 100 may be divided based on another folding area (e.g., a folding area parallel to the x axis) or another folding axis (e.g., a folding axis parallel to the x axis).

The first area 101 and the second area 102 may have generally symmetrical shapes about the folding area 103. However, unlike the first area 101, the second area 102 may include a notch cut due to the presence of the sensor area 524, but may be symmetric to the first area 101 in the area other than the sensor area 524. In other words, the first area 101 and the second area 102 may include portions having mutually symmetrical shapes and portions having mutually asymmetrical shapes.

Hereinafter, operations of the first housing structure 510 and the second housing structure 520 and respective areas of the display 100 depending on the states of the electronic device 10 (e.g., the unfolded state (flat state) and the folded state) will be described.

According to an embodiment, when the electronic device 10 is in the unfolded state (flat state) (e.g., FIG. 1), the first housing structure 510 and the second housing structure 520 may be disposed to form an angle of 180 degrees therebetween and to face the same direction. The surface of the first area 101 and the surface of the second area 102 of the display 100 form 180 degrees relative to each other, and may face the same direction (e.g., the front direction of the electronic device). The folding area 103 may form the same plane as the first area 101 and the second area 102.

In an embodiment, when the electronic device 10 is in the folded state (e.g., FIG. 2), the first housing structure 510 and the second housing structure 520 may be disposed to face each other. The surface of the first area 101 and the surface of the second area 102 of the display 100 may face each other while forming a narrow angle (e.g., an angle between 0 and 10 degrees) relative to each other. At least a portion of the folding area 103 may be a curved face having a predetermined curvature.

According to an embodiment, when the electronic device 10 is in the intermediate state (folded state) (e.g., FIG. 2), the first housing structure 510 and the second housing structure 520 may be disposed to form a predetermined angle relative to each other. The surface of the first area 101 and the surface of the second area 102 of the display 100 may form an angle larger than that in the folded state and smaller than that in the unfolded state. At least a portion of the folding area 103 may have a curved face having a predetermined curvature, and the curvature in this case may be smaller than that in the folded state.

Figure 3:
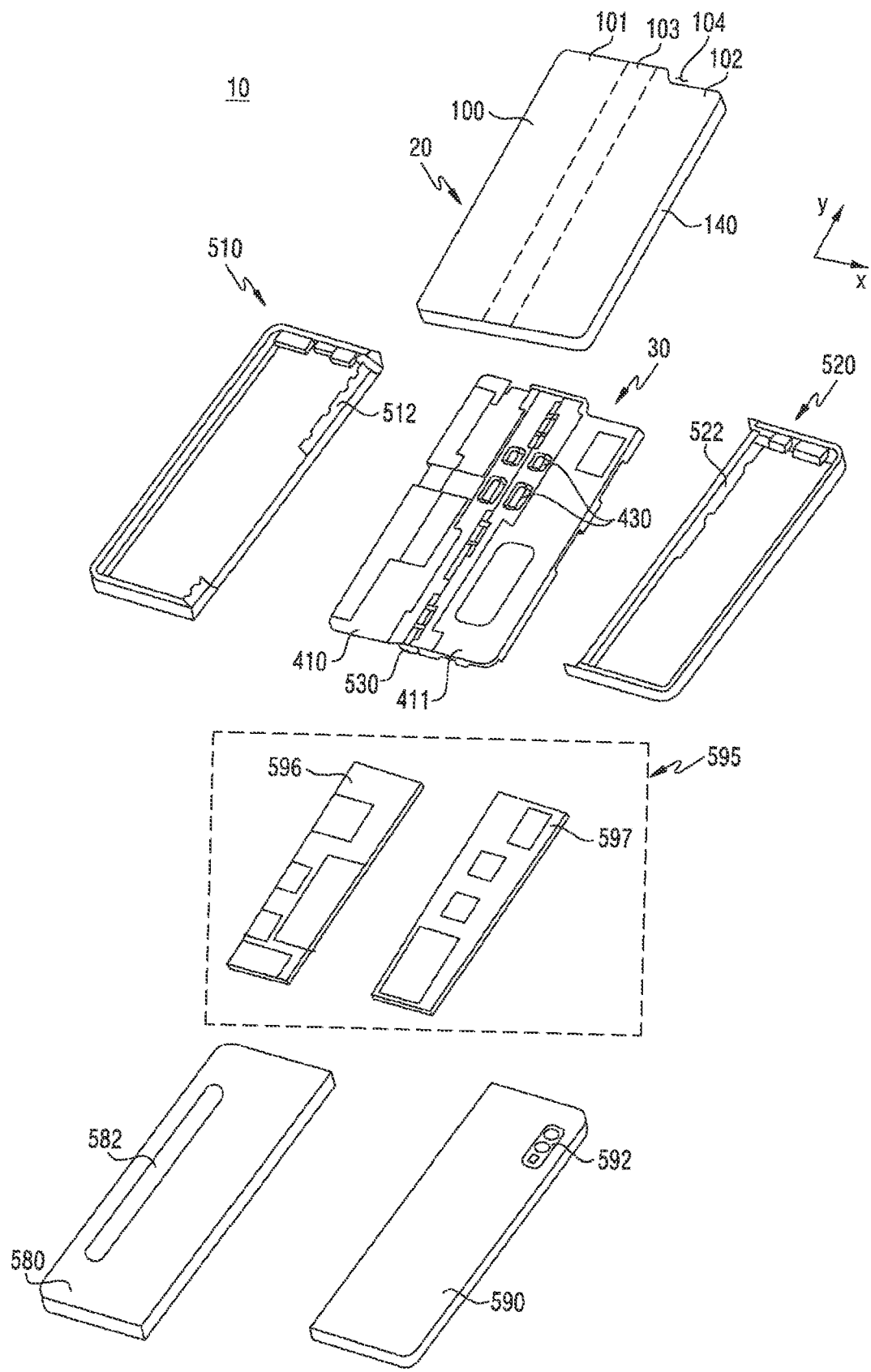
FIG. 3 is an exploded perspective view illustrating an example electronic device according to various embodiments.

FIG. 3 is an exploded perspective view illustrating an example electronic device according to various embodiments.

Referring to FIG. 3, in an embodiment, the electronic device 10 may include at least one of a display unit 20, a bracket assembly 30, a board unit 595, a first housing structure 510, a second housing structure 520, a first rear cover 580, and a second rear cover 590. Herein, the display unit 20 may be referred to as a display module or a display assembly.

The display unit 20 may include a display 100 and at least one plate (or layer) 140 on which the display 100 is seated. In an embodiment, the plate 140 may be disposed between the display 100 and the bracket assembly 30. The display 100 may be disposed on at least a portion of one face (e.g., the top face with reference to FIG. 3) of the plate 140. The plate 140 may be formed in a shape corresponding to that of the display panel 100. For example, an area of the plate 140 may be formed in a shape corresponding to that of a notch 104 in the display 100.

The bracket assembly 30 may include a first bracket 410, a second bracket 420, a hinge structure disposed between the first bracket 410 and the second bracket 420, a hinge cover 530 configured to cover the hinge structure when the hinge structure is viewed from the outside, and a wiring member 430 (e.g., a flexible printed circuit board (FPCB)) extending across the first and second brackets 410 and 420.

In an embodiment, the bracket assembly 30 may be disposed between the plate 140 and the board unit 595. For example, the first bracket 410 may be disposed between the first area 101 of the display 100 and a first board 596. A second bracket 411 may be disposed between the second area 102 and the second board 597 of the display 100.

In an embodiment, at least a portion of wiring members 430 and at least a portion of the hinge structure may be disposed inside the bracket assembly 30. The wiring member 430 may be disposed in a direction across the first bracket 410 and the second bracket 411 (e.g., the x-axis direction). The wiring member 430 may be disposed in a direction (e.g., the x-axis direction) perpendicular to the folding axis (e.g., the y axis or the folding axis A in FIG. 1) of the folding area 103 of the electronic device 10.

As described above, the board unit 595 may include the first board 596 disposed on the first bracket 410 side and the second board 597 disposed on the second bracket 411 side. The first board 596 and the second board 597 may be disposed in a space defined by the bracket assembly 30, the first housing structure 510, the second housing structure 520, the first rear cover 580, and the second rear cover 590. Components for implementing various functions of the electronic device 10 may be mounted on the first board 596 and the second board 597.

The first housing structure 510 and the second housing structure 520 may be assembled so as to be coupled to the opposite sides of the bracket assembly 30 in the state in which the display unit 20 is coupled to the bracket assembly 30. As will be described later, the first housing structure 510 and the second housing structure 520 may be coupled to the bracket assembly 30 by sliding on the opposite sides of the bracket assembly 30.

In an embodiment, the first housing structure 510 may include a first rotational support face 512, and the second housing structure 520 may include a second rotational support face 522, which corresponds to the first rotational support structure 512. The first rotational support face 512 and the second rotational support face 522 may include curved faces corresponding to curved faces included in the hinge cover 530.

In an embodiment, when the electronic device 10 is in the unfolded state (e.g., the electronic device in FIG. 1), the first rotational support face 512 and the second rotational support face 522 may cover the hinge cover 530 so that the hinge cover 530 may not be exposed or minimally exposed to the rear face of the electronic device 101. Meanwhile, when the electronic device 10 is in the folded state (e.g., the electronic device in FIG. 2), the first rotational support face 512 and the second rotational support face 522 may rotate along the curved faces included in the hinger cover 530 so that the hinge cover 530 may be exposed to the rear face of the electronic device 10 as much as possible.

Figure 4:
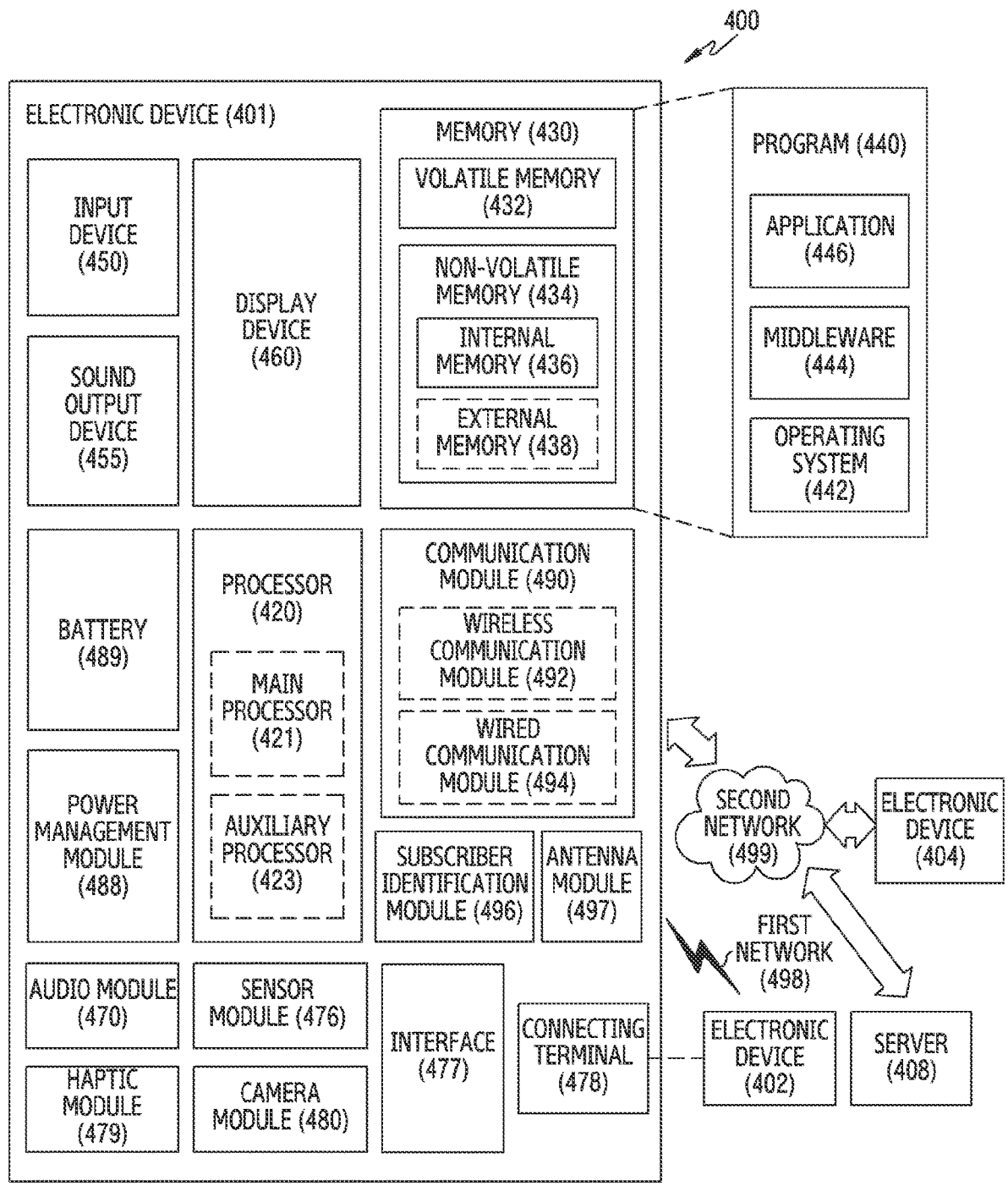
FIG. 4 is a block diagram illustrating an example electronic device in a network environment according to various embodiments.

FIG. 4 is a block diagram illustrating an example electronic device 401 in a network environment 400 according to various embodiments. Referring to FIG. 4, the electronic device 401 in the network environment 400 may communicate with an electronic device 402 via a first network 498 (e.g., a short-range wireless communication network), or an electronic device 404 or a server 408 via a second network 499 (e.g., a long-range wireless communication network). According to an embodiment, the electronic device 401 may communicate with the electronic device 404 via the server 408. According to an embodiment, the electronic device 401 may include a processor 420, memory 430, an input device 450, a sound output device 455, a display device 460, an audio module 470, a sensor module 476, an interface 477, a haptic module 479, a camera module 480, a power management module 488, a battery 489, a communication module 490, a subscriber identification module (SIM) 496, or an antenna module 497. In some embodiments, at least one (e.g., the display device 460 or the camera module 480) of the components may be omitted from the electronic device

401, or one or more other components may be added in the electronic device 401. In some embodiments, some of the components may be implemented as single integrated circuitry. For example, the sensor module 476 (e.g., a fingerprint sensor, an iris sensor, or an illuminance sensor) may be implemented as embedded in the display device 460 (e.g., a display).

The processor 420 may execute, for example, software (e.g., a program 440) to control at least one other component (e.g., a hardware or software component) of the electronic device 401 coupled with the processor 420, and may perform various data processing or computation. According to an example embodiment, as at least part of the data processing or computation, the processor 420 may load a command or data received from another component (e.g., the sensor module 476 or the communication module 490) in volatile memory 432, process the command or the data stored in the volatile memory 432, and store resulting data in non-volatile memory 434. According to an embodiment, the processor 420 may include a main processor 421 (e.g., a central processing unit (CPU) or an application processor (AP)), and an auxiliary processor 423 (e.g., a graphics processing unit (GPU), an image signal processor (ISP), a sensor hub processor, or a communication processor (CP)) that is operable independently from, or in conjunction with, the main processor 421. Additionally or alternatively, the auxiliary processor 423 may be adapted to consume less power than the main processor 421, or to be specific to a specified function. The auxiliary processor 423 may be implemented as separate from, or as part of the main processor 421.

The auxiliary processor 423 may control at least some of functions or states related to at least one component (e.g., the display device 460, the sensor module 476, or the communication module 490) among the components of the electronic device 401, instead of the main processor 421 while the main processor 421 is in an inactive (e.g., sleep) state, or together with the main processor 421 while the main processor 421 is in an active state (e.g., executing an application). According to an embodiment, the auxiliary processor 423 (e.g., an image signal processor or a communication processor) may be implemented as part of another component (e.g., the camera module 480 or the communication module 490) functionally related to the auxiliary processor 423.

The memory 430 may store various data used by at least one component (e.g., the processor 420 or the sensor module 476) of the electronic device 401. The various data may include, for example, software (e.g., the program 440) and input data or output data for a command related thereto. The memory 430 may include the volatile memory 432 or the non-volatile memory 434.

The program 440 may be stored in the memory 430 as software, and may include, for example, an operating system (OS) 442, middleware 444, or an application 446.

The input device 450 may receive a command or data to be used by other component (e.g., the processor 420) of the electronic device 401, from the outside (e.g., a user) of the electronic device 401. The input device 450 may include, for example, a microphone, a mouse, a keyboard, or a digital pen (e.g., a stylus pen).

The sound output device 455 may output sound signals to the outside of the electronic device 401. The sound output device 455 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 460 may visually provide information to the outside (e.g., a user) of the electronic device 401. The display device 460 may include, for example, a display, a hologram device, or a projector and control circuitry to control a corresponding one of the display, hologram device, and projector. According to an embodiment, the display device 460 may include touch circuitry adapted to detect a touch, or sensor circuitry (e.g., a pressure sensor) adapted to measure the intensity of force incurred by the touch.

The audio module 470 may convert a sound into an electrical signal and vice versa. According to an embodiment, the audio module 470 may obtain the sound via the input device 450, or output the sound via the sound output device 455 or a headphone of an external electronic device (e.g., an electronic device 402) directly (e.g., wiredly) or wirelessly coupled with the electronic device 401.

The sensor module 476 may detect an operational state (e.g., power or temperature) of the electronic device 401 or an environmental state (e.g., a state of a user) external to the electronic device 401, and then generate an electrical signal or data value corresponding to the detected state. According to an embodiment, the sensor module 476 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 477 may support one or more specified protocols to be used for the electronic device 401 to be coupled with the external electronic device (e.g., the electronic device 402) directly (e.g., wiredly) or wirelessly. According to an embodiment, the interface 477 may include, for example, a high definition multimedia interface (HDMI), a universal serial bus (USB) interface, a secure digital (SD) card interface, or an audio interface.

A connecting terminal 478 may include a connector via which the electronic device 401 may be physically connected with the external electronic device (e.g., the electronic device 402). According to an embodiment, the connecting terminal 478 may include, for example, a HDMI connector, a USB connector, a SD card connector, or an audio connector (e.g., a headphone connector).

The haptic module 479 may convert an electrical signal into a mechanical stimulus (e.g., a vibration or a movement) or electrical stimulus which may be recognized by a user via his tactile sensation or kinesthetic sensation. According to an embodiment, the haptic module 479 may include, for example, a motor, a piezoelectric element, or an electric stimulator.

The camera module 480 may capture a still image or moving images. According to an embodiment, the camera module 480 may include one or more lenses, image sensors, image signal processors, or flashes.

The power management module 488 may manage power supplied to the electronic device 401. According to an example embodiment, the power management module 488 may be implemented as at least part of, for example, a power management integrated circuit (PMIC).

The battery 489 may supply power to at least one component of the electronic device 401. According to an embodiment, the battery 489 may include, for example, a primary cell which is not rechargeable, a secondary cell which is rechargeable, or a fuel cell.

The communication module 490 may support establishing a direct (e.g., wired) communication channel or a wireless communication channel between the electronic device 401 and the external electronic device (e.g., the electronic device 402, the electronic device 404, or the server 408) and performing communication via the established communication channel. The communication module 490 may include one or more communication processors that are operable independently from the processor 420 (e.g., the application processor (AP)) and supports a direct (e.g., wired) communication or a wireless communication. According to an embodiment, the communication module 490 may include a wireless communication module 492 (e.g., a cellular communication module, a short-range wireless communication module, or a global navigation satellite system (GNSS) communication module) or a wired communication module 494 (e.g., a local area network (LAN) communication module or a power line communication (PLC) module). A corresponding one of these communication modules may communicate with the external electronic device via the first network 498 (e.g., a short-range communication network, such as Bluetooth™ wireless-fidelity (Wi-Fi) direct, or infrared data association (IrDA)) or the second network 499 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 492 may identify and authenticate the electronic device 401 in a communication network, such as the first network 498 or the second network 499, using subscriber information (e.g., international mobile subscriber identity (IMSI)) stored in the subscriber identification module 496.

The antenna module 497 may transmit or receive a signal or power to or from the outside (e.g., the external electronic device) of the electronic device 401. According to an embodiment, the antenna module 497 may include an antenna including a radiating element composed of a conductive material or a conductive pattern formed in or on a substrate (e.g., PCB). According to an embodiment, the antenna module 497 may include a plurality of antennas. In such a case, at least one antenna appropriate for a communication scheme used in the communication network, such as the first network 498 or the second network 499, may be selected, for example, by the communication module 490 (e.g., the wireless communication module 492) from the plurality of antennas. The signal or the power may then be transmitted or received between the communication module 490 and the external electronic device via the selected at least one antenna. According to an embodiment, another component (e.g., a radio frequency integrated circuit (RFIC)) other than the radiating element may be additionally formed as part of the antenna module 497.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 401 and the external electronic device 404 via the server 408 coupled with the second network 499. Each of the electronic devices 402 and 404 may be a device of a same type as, or a different type, from the electronic device 401. According to an embodiment, all or some of operations to be executed at the electronic device 401 may be executed at one or more of the external electronic devices 402, 404, or 408. For example, if the electronic device 401 should perform a function or a service automatically, or in response to a request from a user or another device, the electronic device 401, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 401. The electronic device 401 may provide the outcome, with or without further processing of the outcome, as at least part of a reply to the request. To that end, a cloud computing, distributed computing, or client-server computing technology may be used, for example.

Figure 5:
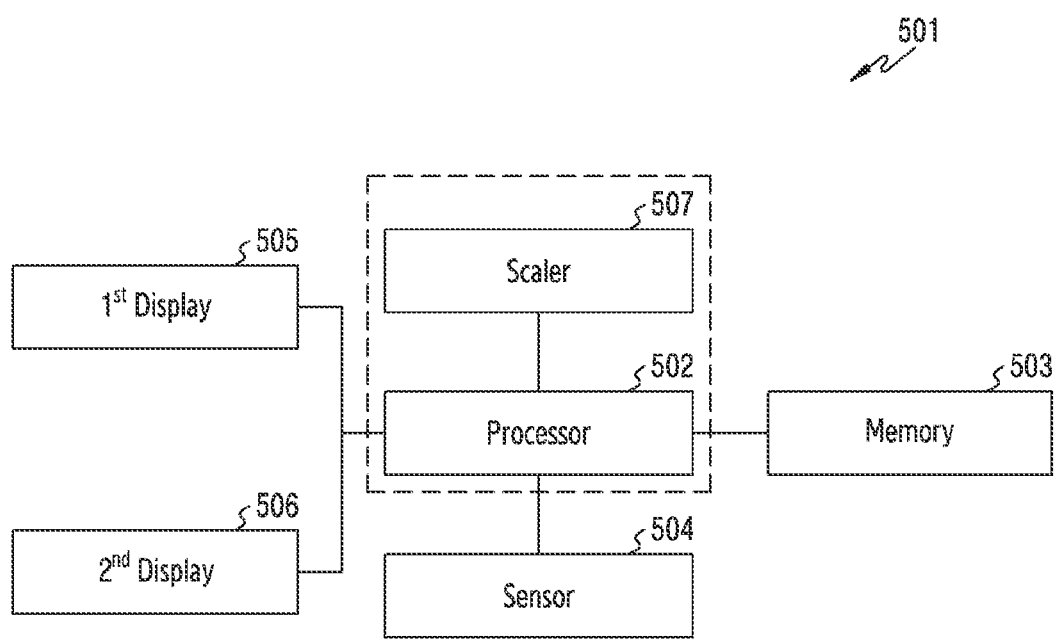
FIG. 5 is a block diagram illustrating an example electronic device according to various embodiments.

FIG. 5 is a block diagram illustrating an example electronic device according to various embodiments.

Referring to FIG. 5, an electronic device 501 (e.g., the electronic device 10 in FIGS. 1, 2 and 3 or the electronic device 401 in FIG. 4) may include at least one of a processor (e.g., including processing circuitry) 502 (e.g., the processor 420 in FIG. 4), memory 503 (e.g., the memory 429 in FIG. 4), a sensor 504 (e.g., the sensor module 476 in FIG. 4), a first display (e.g., the display 100 in FIG. 1) 505, a second display (e.g., the sub-display 190 in FIGS. 1 and 2) 506, and/or a scaler (e.g., including processing circuitry and/or executable program elements) 507.

According to various embodiments, the electronic device 501 may include a foldable housing. The foldable housing may include a hinge structure in which a foldable portion of the foldable housing is disposed, a first housing structure connected to the hinge structure, and a second housing structure that is folded with the first housing structure about the hinge structure. The first housing structure may include a first face oriented in a first direction and a second face oriented in a second direction, which is opposite the first direction. The second housing structure may include a third face oriented in a third direction and a fourth face oriented in a fourth direction, which is opposite the third direction. According to various embodiments, in the state in which the foldable housing is folded, the first face of the first housing structure faces the third face of the second housing structure, and in the state in which the foldable housing is completely unfolded, the first direction in which the first face of the first housing is oriented and the third direction in which the third face of the second housing structure is oriented may be the same. It is noted that an intermediate folded state in which an angle is formed between the first direction of the first face and the third direction of the third face may also be achieved. According to various embodiments, the foldable housing may include a first display 505 in a space formed by the foldable housing. According to an embodiment, the first display 505 may include a flexible display, and may extend from the first face of the first housing structure to the third face of the second housing structure so as to form first and third faces. According to an embodiment, the first display 505 may include a first main display, which is visible through the first face of the first housing and a second main display, which is visible through the third face of the second housing structure. According to an embodiment, the second display 506 may form one of the second face of the first housing or the fourth face of the second housing. According to an embodiment, the size (or resolution) and pixel density of the first display 505 may be different from the size and pixel density of the second display 506. According to various embodiments, the pixel density may be referred to as dots per inch (DPI) or pixels per inch (PPI).

According to various embodiments, the processor 120 may include various processing circuitry and drive, for example, an operating system or an application so as to control a plurality of hardware or software components connected thereto, and may also perform various kinds of data processing and arithmetic operations. According to an embodiment, the processor 502 may be implemented as a system-on-chip (SoC). According to an embodiment, the processor 210 may further include a graphic processing unit (GPU) and/or an image signal processor. The processor 502 may load an instruction or data received from at least one of other components into the memory 503 so as to process the command and data, and may store various data in the memory 503.

According to various embodiments, the processor 502 may control the electronic device 501 to display a content through a first display. For example, the processor 502 may determine a window corresponding to the first size of the first display 505 based on information (e.g., the size and/or pixel density) associated with the first display 505, may generate at least one first surface image based on the determined window, and may display the generated at least one first surface image on the first display 505. According to an embodiment, the processor 502 may blend the at least one first surface image so as to generate a content to be displayed through the first display 505, and may display at least one first surface image through the first display 505 by displaying the generated content through the first display 505. According to an embodiment, the window may represent information for managing a screen area corresponding to an application. For example, the window may be an object or instance corresponding to a specified data structure, and may be created and deleted in response to an application request. The window may include the address of a graphic buffer and frame area information for an application to draw graphic data. According to an embodiment, the window may be referred to as a layer.

According to various embodiments, the processor 502 may detect a first event or a second event based on the data acquired from the sensor 504. For example, the processor 502 may identify that the electronic device 501 is switched from a first state (e.g., the unfolded state) to a second state (e.g., the folded state) based on data acquired from the sensor 504. When it is identified that the electronic device 501 is switched from the first state to the second state, the processor 502 may determine that the first event is detected. As another example, the processor 502 may identify that the electronic device 501 is switched from the second state to the first state based on data acquired from the sensor 504. When it is identified that the electronic device 501 is switched from the second state to the first state, the processor 502 may determine that the second event is detected.

According to various embodiments, when the first event is detected while a content is being displayed through the first display 505, the processor 502 may display, through the second display 506, another content associated with the content displayed on the first display 505. For example, the processor 502 may change the size of the window to a third size, which is distinguished from the first size of the first display 505 and the second size of the second display 506 based on information associated with the first display 505 (e.g., the size and pixel density) and information associated with the second display 506, and may display at least one second surface image generated based on the window changed to the third size through the second display 506.

According to an embodiment, the processor 502 may generate at least one second surface image based on the window changed to the third size, may adjust the size of the at least one generated second surface image to the second size of the second display 506, may blend the at least one second surface image, of which the size is adjusted to the second size, so as to generate a content to be displayed through the second display 506, and may display the at least one second surface image through the second display 506 by displaying the generated content through the second display 506. According to an embodiment, the processor 502 may generate at least one second surface image based on the window, of which the size is changed to the third size, may blend the at least one generated second surface image so as to generate a content, may adjust the size of the generated content to the second size of the second display 506, and may display the at least one second surface image through the second display 506 by displaying the content, of which the content is adjusted to the second size, through the second display 506.

According to various embodiments, when the second event is detected while the content is being displayed through the second display 506, the processor 502 may display, through the first display 506, another content associated with the content displayed on the second display 506. For example, the processor 502 may change the size of the window to the first size of the first display 505, may generate at least one third surface image based on the window, of which the size is changed to the first size, and may display the at least one generated third surface image through the first display 505. According to an embodiment, the processor 502 may generate a content by blending the at least one third surface image, and may display at least one third surface image through the first display 505 by displaying the generated content through the first display 505. According to an embodiment, the at least one third surface image may be generated through the same application as the at least one first surface image and the at least one second surface image.

According to various embodiments, the scaler 507 may include various processing circuitry and/or executable program elements, and may be included in the processor 502 in, for example, a hardware implementation.

Figure 6:
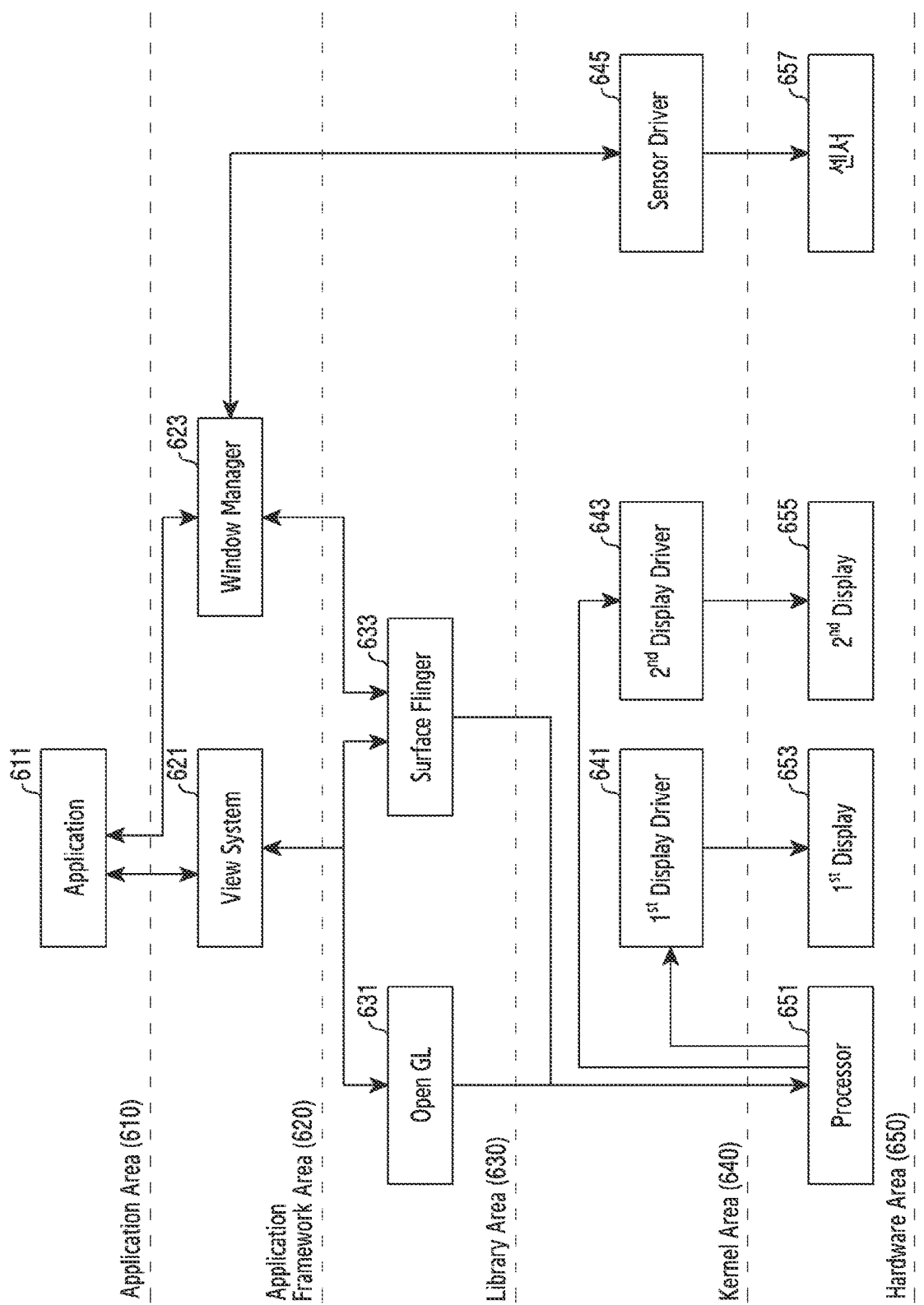
FIG. 6 is a diagram illustrating an example view hierarchy structure of an electronic device according to various embodiments.

FIG. 6 is a diagram illustrating an example view hierarchy structure of an electronic device according to various embodiments.

According to various embodiments, a view hierarchy structure of an electronic device (e.g., the electronic device 10 in FIGS. 1, 2 and 3, the electronic device 401 in FIG. 4, or the electronic device 501 in FIG. 5) may include an application area 610, an application framework area 620, a library area 630, a kernel area 640, and a hardware area 650. According to an embodiment, the application area 610 may include an application 611. According to an embodiment, the application framework area 620 may include a view system 621 and a window manager 623. According to an embodiment, the library area 630 may include an open GL 631 and a surface flinger 633. According to an embodiment, the kernel area 640 may include a first display driver 641, a second display driver 643, and a sensor driver 645. According to an embodiment, the hardware area 650 may include a processor 651 (e.g., the processor 420 in FIG. 4 or the processor 502 in FIG. 5), a first display 653 (e.g., the display device 460 in FIG. 4 or the first display 505 in FIG. 5), a second display 655 (e.g., the display device 460 in FIG. 4 or the second display 506 in FIG. 5), and sensor 655 (e.g., the sensor module 476 in FIG. 4 or the sensor 504 in FIG. 5).

According to various embodiments, when the application 611 of the application area 610 is executed, the view system 621 and the window manager 623 of the application framework area 620 may be requested to configure a screen related to the application 611. The view system 621 and the window manager 623 may acquire data related to the screen configuration from the library area 630 or may deliver the data to the library area 630.

According to various embodiments, the application 611 may make a request regarding the screen configuration to the view system 621 and the window manager 623. In response to the request of the application 611, the view system 621 may request screen configuration from the open GL 431 and/or the surface flinger 633.

The window manager 623 may determine the size (or resolution) of the window in response to the request of the application 611. For example, the window manager 623 may determine the size of the window based on information associated with the first display 653 or the second display 655 (e.g., size or resolution information).

According to various embodiments, the open GL 631 of the library area 630 may perform an operation of rendering an execution screen of the application 611. According to various embodiments, the surface flinger 633 may lender a content corresponding to a corresponding frame by allocating a frame buffer depending on the size of the window determined by the window manager 623. For example, the surface plunger 633 may generate surface images in a size corresponding to the size of the window determined by the window manager 623 in response to the request of the view system 621, and blends the generated surface images so as to generate video information. According to various embodiments, the size of the video information generated by the surface plunger 633 may be changed (increased or decreased) to correspond to the screen resolution through a hardware scaler.

According to various embodiments, when the video information is generated in the library area 630, the processor 651 of the hardware area 650 may generate a screen to be displayed on the first display 653 depending on the image information, and the first display driver 641 in the kernel area 640 may allocate a resource to the first display 653 such that the generated screen is capable of being displayed on the first display 653 and may deliver the generated screen to the first display 653.

According to various embodiments, when the sensor 657 senses the state switching of the electronic device (e.g., switching from the unfolded state to the folded state) while the screen is being displayed through the first display 653, the sensor driver 645 may provide the window manager 623 with information associated with the state switching of the electronic device. In response to receiving the information associated with the state switching of the electronic device, the window manager 623 may change the size of the window based on the information associated with the first display 653 and the second display 655. The surface flinger 633 may generate surface images based on the changed window, and may generate video information by blending the generated surface images. The processor 651 may adjust the size of the video information generated in the library area 630 depending on the information associated with the second display 655, and may generate a screen to be displayed on the second display 655 using the size-adjusted video information. In order to enable the screen generated by the processor 651 to be displayed on the second display 655, the second display driver 643 may allocate a resource to the second display 655, and may deliver the screen generated by the processor 651 to the second display 655.

According to various embodiments, when the sensor 657 senses the state switching of the electronic device (e.g., switching from the folded state to the unfolded state) while the screen is being displayed through the second display 655, the sensor driver 645 may provide the window manager 623 with information associated with the state switching of the electronic device. In response to receiving the information associated with the state switching of the electronic device, the window manager 623 may change the size of the window based on the information associated with the first display 653. The surface flinger 633 may generate surface images based on the changed window, and may generate video information by blending the generated surface images. The processor 651 may adjust the size of the video information generated in the library area 630 depending on the information associated with the first display 653, and may generate a screen to be displayed on the first display 653 using the size-adjusted video information. In order to enable the screen generated by the processor 651 to be displayed on the first display 653, the first display driver 641 may allocate a resource to the first display 653, and may deliver the screen generated by the processor 651 to the first display 653.

According to various example embodiments, an electronic device (e.g., the electronic device 10 in FIGS. 1, 2 and 3, the electronic device 401 in FIG. 4, or the electronic device 501 in FIG. 5) may include: a foldable housing including: a hinge, a first housing connected to the hinge, and including a first face oriented in a first direction, and a second face oriented in a second direction opposite the first direction, and a second housing connected to the hinge and including a third face oriented in a third direction, and a fourth face oriented in a fourth direction opposite the third direction, the second housing configured to be folded with the first housing about the hinge, wherein, in a folded state, the first face faces the third face, and in a fully unfolded state, the third direction is the same as the first direction; at least one sensor (e.g., the sensor module 476 in FIG. 4 or the sensor 504 in FIG. 5) disposed inside the foldable housing; a first display (e.g., the display 100 in FIG. 1 or the first display 505 in FIG. 5) extending from the first face to the third face to define the first face and the third face, the first display having a first size and a first pixel density; a second display (e.g., the sub-display 190 in FIGS. 1 and 2 or the second display 506 in FIG. 5) defining the second face and having a second size different from the first size and a second pixel density different from the first pixel density; a processor (e.g., the processor 420 in FIG. 4 or the processor 502 in FIG. 5) disposed inside the first housing or the second housing, and operatively connected to the at least one sensor, the first display, and the second display; and a memory (e.g., the memory 430 in FIG. 4 or the memory 503 in FIG. 5) operatively connected to the processor. The memory may store instructions that, when executed, cause the processor to control the electronic device to: display at least one first surface image generated based on the window having a first size through the first display; change the size of the window to a third size different from the first size and the second size based on information associated with the first display and information associated with the second display in response to detecting a first event through the at least one sensor based on the at least one first surface image being displayed through the first display; and display at least one second surface image generated based on the window, of which the size has been changed to the third size, through the second display.

According to various example embodiments, the instructions, when executed, may cause the processor to control the electronic device to determine that the first event is detected based on the processor identifying that the foldable housing is switched from the unfolded state to the folded state based on information acquired from the at least one sensor.

According to various example embodiments, the instructions, when executed, may cause, as at least a part of an operation of displaying the at least one second surface image through the second display, the processor to control the electronic device to: generate the at least one second surface image based on the window, of which the size has been changed to the third size; adjust a size of the at least one second surface image to the second size of the second display such that the size of the at least one second surface image corresponds to the second size of the second display; generate a content by blending the at least one second surface image, of which the size has been adjusted to the second size; and displaying the generated content through the second display.

According to various example embodiments, the electronic device may further include a scaler (e.g., the scaler 507 in FIG. 5). The instructions, when executed, may cause, as at least a part of an operation of adjusting the size of the at least one second surface image to the second size, the processor to control the electronic device to: adjust the size of the at least one second surface image together with the scaler based on the number of second surface images exceeding a threshold; and adjust the size of the at least one second surface image through the scaler based on the number of second surface images being equal to or less than the threshold.

According to various example embodiments, the third size may be smaller than the first size and the third size may be larger than the second size, and the instructions, when executed, may cause, as at least a part of the operation of adjusting the size of the at least one second surface image to the second size, the processor to control the electronic device to: perform down-scaling on the at least one second surface image such that the at least one second surface image is capable of having the second size.

According to various example embodiments, the instructions, when executed, may cause, as at least a part of an operation of adjusting the size of the at least one second surface image to the second size, the processor to control the electronic device to: generate the at least one second surface image based on the window, of which the size has been changed to the third size; generate a content by blending the at least one second surface image; adjust a size of the generated content to the second size of the second display such that the size of the generated content corresponds to the second size of the second display; and display the content, of which the size has been adjusted to the second size, through the second display.

According to various example embodiments, the third size may be smaller than the first size and the third size may be larger than the second size, and the instructions, when executed, may cause, as at least a part of the operation of adjusting the size of the generated content to the second size, the processor to control the electronic device to perform down-scaling on the generated content such that the generated content is capable of having the second size.

According to various example embodiments, the at least one first surface image and the at least one second surface image may be images generated through the same application.

According to various example embodiments, the instructions, when executed, may cause the processor to control the electronic device to: change the size of the window, of which the size has been changed to the third size, to the first size in response to detecting a second event based on the at least one second surface image being displayed through the second display; generate at least one third surface image based on the window, of which the size has been changed to the first size; and display the at least one third surface image through the first display.

According to various example embodiments, the instructions, when executed, may cause the processor to control the electronic device to determine that the second event is detected based on the processor identifying that the foldable housing is switched from the folded state to the unfolded state based on information acquired from the at least one sensor.

Figure 7:
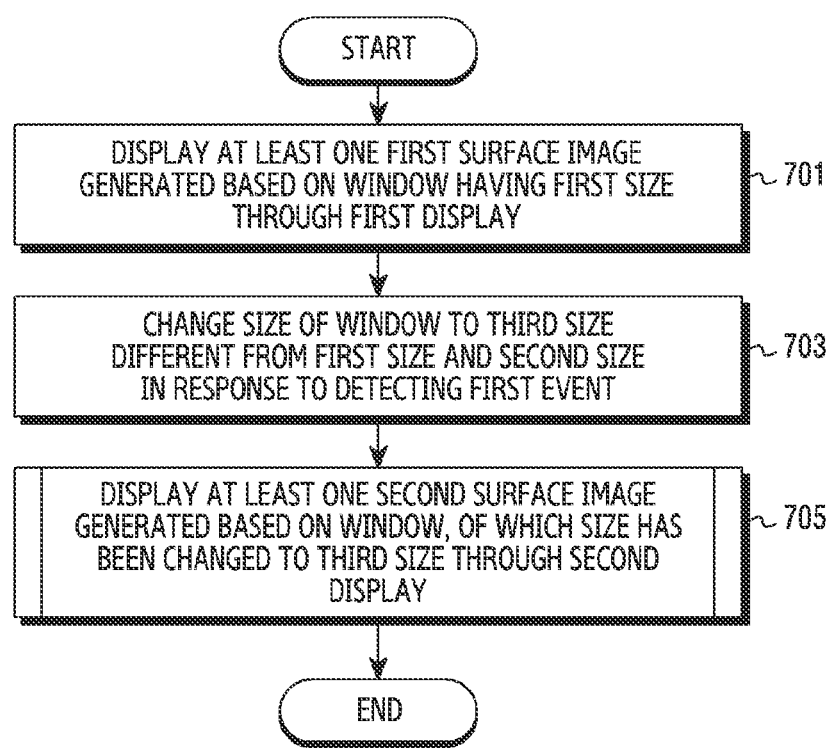
FIG. 7 is a flowchart illustrating an example method of displaying contents in an electronic device according to various embodiments.
Figure 8:
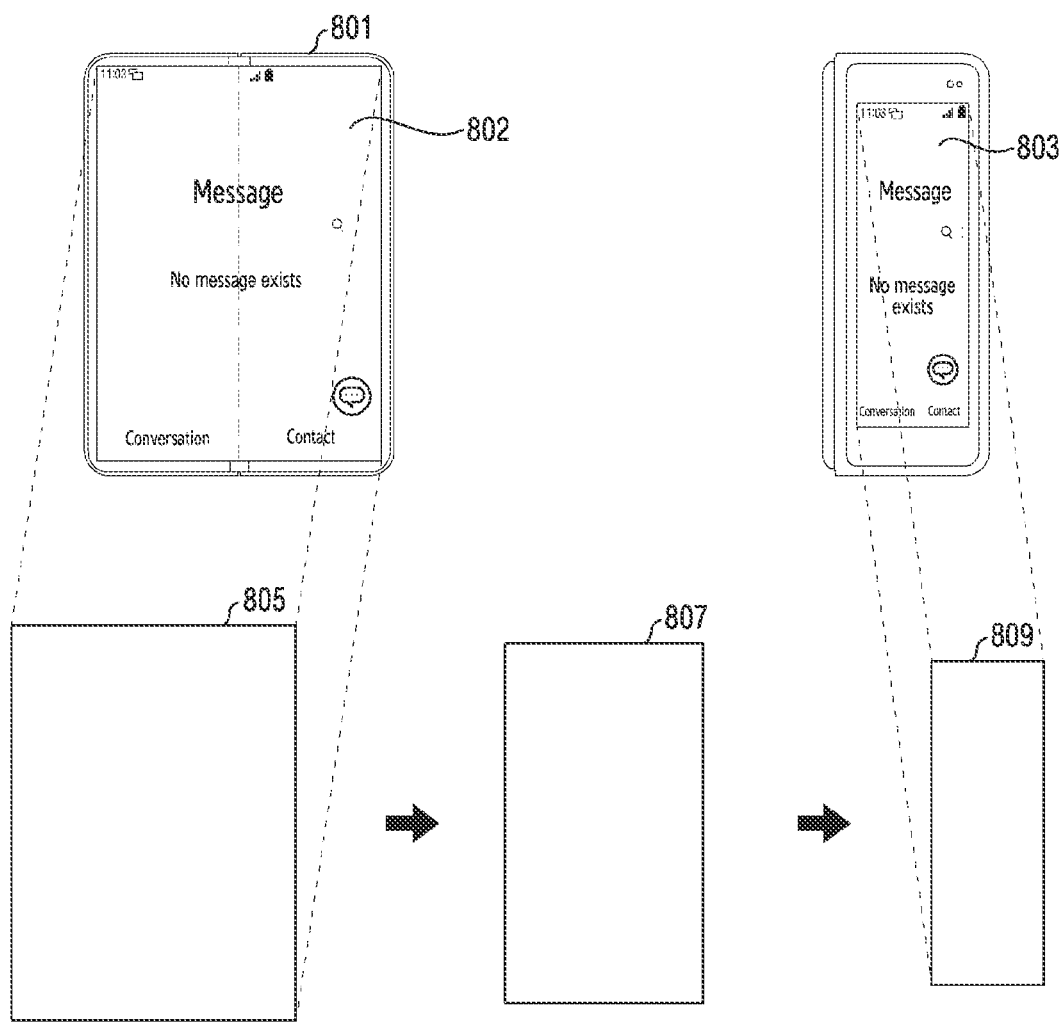
FIG. 8 is a diagram illustrating an example method of displaying contents in an electronic device according to various embodiments.

FIG. 7 is a flowchart illustrating an example method of displaying contents in an electronic device according to various embodiments. FIG. 8 is a diagram illustrating an example method of displaying contents in an electronic device according to various embodiments.

According to various embodiments, an electronic device (e.g., the electronic device 10 in FIGS. 1, 2 and 3, the electronic device 401 in FIG. 4, or the electronic device 501 in FIG. 5) may include a first display (e.g., the display 100 in FIG. 1 or the first display 505 in FIG. 5) and a second display (e.g., the sub-display 190 in FIGS. 1 and 2 or the second display 506 in FIG. 5). According to various embodiments, the first display 505 may have a first size (or resolution) and a first pixel density, and the second display 506 may have a second size different from the first size and a second pixel density distinguished from the first pixel density. According to various embodiments, the electronic device 501 may provide a screen through the first display 505 in the unfolded state, and may provide a screen through the second display 506 in the folded state.

Referring to FIGS. 7 and 8, in operation 701, a processor (e.g., the processor 420 in FIG. 4 or the processor 502 in FIG. 5) of an electronic device (e.g., the electronic device 10 in FIGS. 1, 2 and 3, the electronic device 401 in FIG. 4, or the electronic device 501 in FIG. 5) may display at least one first surface image generated based on a window having a first size through a first display (e.g., the display 100 in FIG. 1 or the first display 500 in FIG. 5). For example, as illustrated in FIG. 8, the processor 502 may determine a window having a first size 805 (or resolution) of a first display 802 in response to receiving an execution request of an application (e.g., a user input) while the electronic device 801 is in a unfolded state, may generate at least one first surface image corresponding to the application for which the execution request is made based on the window having the first size 805, may generate a content by blending the at least one first surface image, and may display the generated content through the first display 802.

In operation 703, the processor 502 may change the size of the window to a third size different from the first size and the second size in response to detecting a first event while the at least one first surface image is displayed through the first display 505. For example, when a first event is detected while the at least one first surface image is displayed through the first display 505, the processor 502 may identify a ratio between the first pixel density of the first display 505 and the second pixel density of the second display 502 based on the information (e.g., the sizes and pixel densities) associated with the first display 505 and the second display 506, and may determine a third size by expanding the second size by the identified ratio, and may change the size of the window to the determined third size. As illustrated in FIG. 8, when the first display 802 has a resolution of 1536×2152 and a pixel density of 420 dpi, and the second display 803 has a resolution of 720×1680 and a pixel density of 360 dpi, the processor 502 may identify the ratio between the pixel densities of the first display 802 and the second display 803 (e.g., 7/6), may determine the resolution of 840×1920 obtained by expanding the resolution of the second display 803 by the identified ratio to be a third size 807, and may change the size of the window from the first size 805 to the third size 807. According to an embodiment, when it is identified that the shape of the electronic device 501 is switched from the unfolded state to the folded state based on the information acquired from the sensor 504, the processor 502 may determine that the first event is detected.

In operation 705, the processor 502 may display the at least one second surface image generated based on the window, of which the size has been changed to the third size, through the second display. For example, as illustrated in FIG. 8, the processor 502 may generate at least one second surface image corresponding to an application that is being executed based on the window changed to the third size 807, may adjust the size of the at least one generated second surface image to the second size 809, may generate a content by blending the at least one second surface image, of which the size has been adjusted to the second size 809, and may display the generated content through the second display 506. As another example, as illustrated in FIG. 8, the processor 502 may generate at least one second surface image based on the window, of which the size has been changed to the third size 807, may generate a content to be displayed through the second display by blending the at least one generated second surface image, may adjust the size of the generated content to the second size, and may display the content, of which the size has been adjusted to the second size, through the second display 506.

When the electronic device 501 according to various embodiments detects the first event in the state of including the first display 505 and the second display 506 having different pixel densities, the electronic device 501 may continuously display a content associated with the content, which is being displayed through the first display 505, through the second display 506 by performing operations 701 to 705. Accordingly, the electronic device 501 may provide the user with a continuous application environment.

Figure 9:
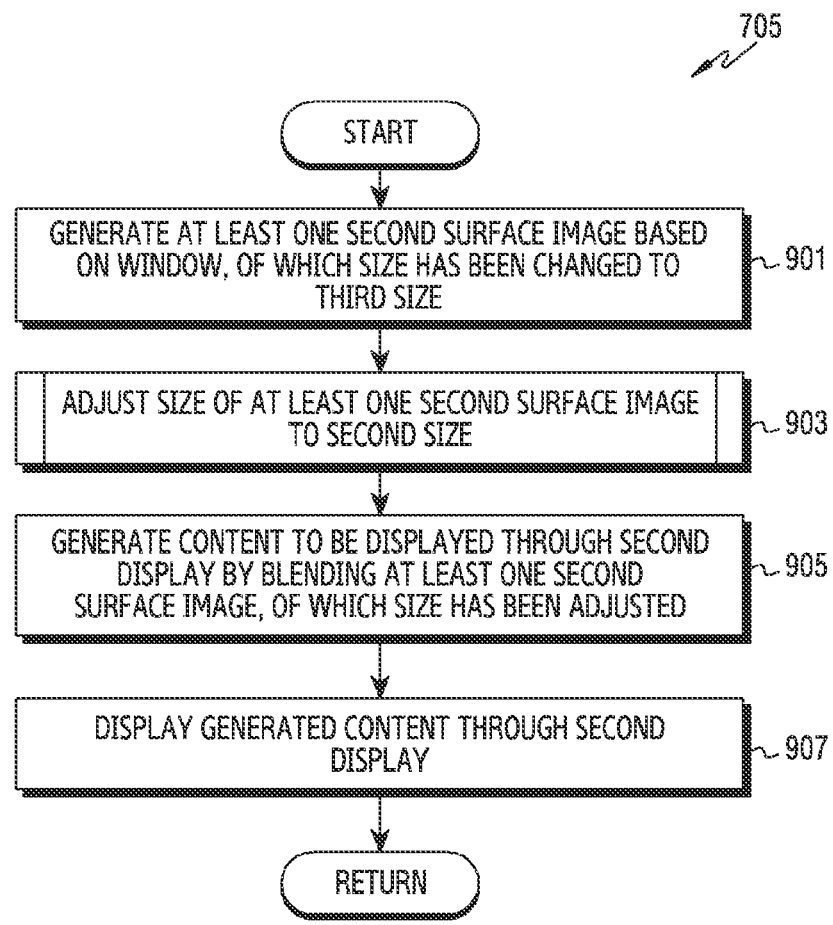
FIG. 9 is a flowchart illustrating an example method of displaying at least one second surface image through a second display in an electronic device according to various embodiments.

FIG. 9 is a flowchart illustrating an example method of displaying at least one second surface image through a second display in an electronic device according to various embodiments. The following description may be include detailed operations of an operation of displaying the at least one second surface image generated based on the window, of which the size has been changed to the third size, through the second display in operation 705 in FIG. 7.

Referring to FIG. 9, in operation 901, a processor (e.g., the processor 420 in FIG. 4 or the processor 502 in FIG. 5) of an electronic device (e.g., the electronic device 10 in FIGS. 1, 2 and 3, the electronic device 401 in FIG. 4, or the electronic device 501 in FIG. 5) may generate at least one second surface image generated based on a window, of which the size has been changed to a third size. For example, as illustrated in FIG. 8, the processor 502 may generate at least one second surface image corresponding to an application, which is being executed, in the third size 807 (or resolution).

In operation 903, the processor 502 may adjust the size of the at least one second surface image to the second size. For example, as illustrated in FIG. 8, the processor 502 may adjust the size of the at least one second surface image to the second size 809 of the second display 803. According to an embodiment, the processor 502 may adjust the size of the at least one second surface image through the scaler 507 or may adjust the size of the at least one second surface image together with the scaler 507.

In operation 905, the processor 502 may generate a content to be displayed through the second display 506 by blending the at least one second surface image, of which the size has been adjusted.

In operation 907, the processor 502 may display the generated content through the second display 506. For example, as illustrated in FIG. 8, the processor 502 may display the content, of which the size has been adjusted to the second size 809, through the second display 803.

Figure 10:
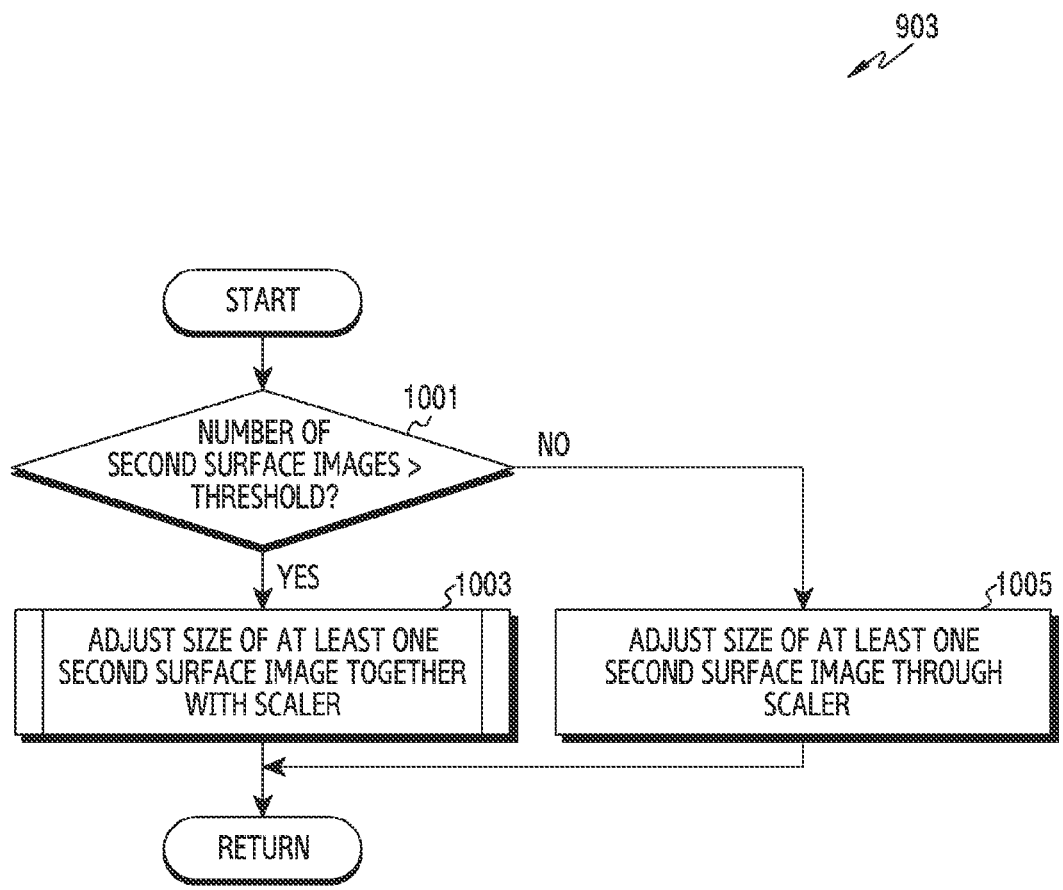
FIG. 10 is a flowchart illustrating an example method of adjusting the size of at least one second surface image to a second size in an electronic device according to various embodiments.

FIG. 10 is a flowchart illustrating an example method of adjusting the size of at least one second surface image to a second size in an electronic device according to various embodiments. The following description may be related to operations of the operation of the size of the at least one second surface to the second size in operation 903 of FIG. 9.

Referring to FIG. 10, in operation 1001, an electronic device (e.g., the electronic device 10 in FIGS. 1, 2 and 3, the electronic device 401 in FIG. 4, or the electronic device 501 in FIG. 5) may determine whether the number of second surface images exceeds a threshold. According to an embodiment, the threshold may refer, for example, to a maximum number of surface images, which are capable of being subjected to up-scaling or down-scaling in a scaler (e.g., the scaler 507 in FIG. 5). When the number of second surface images exceeds the threshold, the processor 502 may perform operation 1003, and when the number of second surface images is equal to or less than the threshold, the processor 502 may perform operation 1005.

In operation 1003, when the number of second surface images exceeds the threshold, the processor 502 may adjust the size of the at least one second surface image together with the scaler 507. For example, the processor 502 may adjust the size of some of the second surface images from the third size to the second size via the scaler 507, and may adjust the rest of the second surface images to the third size. In this case, the number of surface images adjusted by the scaler 507 is equal to the maximum number of surface images that can be processed by the scaler 507 or less than the maximum number of surface images that can be processed by the scaler 507.

In operation 1005, when the number of second surface images is equal to or less than the threshold, the processor 502 may adjust the size of the at least one second surface image through the scaler 507. For example, as illustrated in FIG. 8, the processor 502 may adjust the size of the at least one second surface image from the third size 807 to the second size 809 through the scaler 507.

Figure 11:
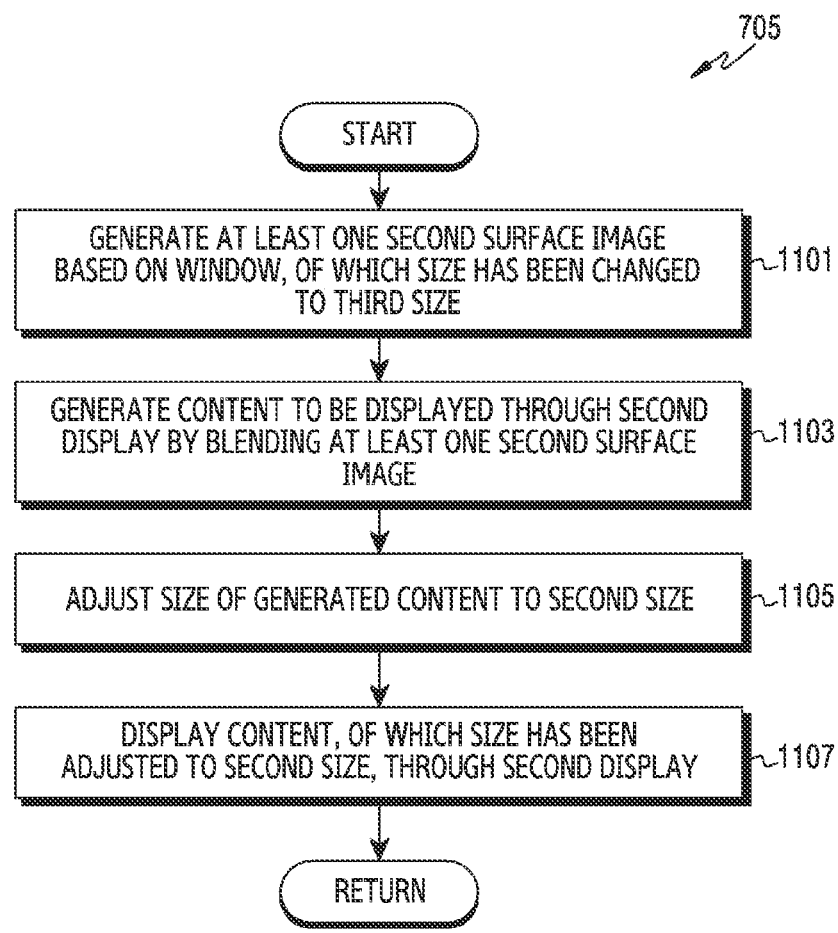
FIG. 11 is a flowchart illustrating another example method of displaying at least one second surface image through a second display in an electronic device according to various embodiments.

FIG. 11 is a flowchart illustrating another example method of displaying at least one second surface image through a second display in an electronic device according to various embodiments. The following description may be related to operations of an operation of displaying the at least one surface image generated based on the window, of which the size has been changed to the third size, through the second display in operation 705 in FIG. 7.

Referring to FIG. 11, in operation 1101, a processor (e.g., the processor 420 in FIG. 4 or the processor 502 in FIG. 5) of an electronic device (e.g., the electronic device 10 in FIGS. 1, 2 and 3, the electronic device 401 in FIG. 4, or the electronic device 501 in FIG. 5) may generate at least one second surface image generated based on a window, of which the size has been changed to a third size. For example, as illustrated in FIG. 8, the processor 502 may generate at least one second surface image corresponding to an application, which is being executed, in the third size 807 (or resolution).

In operation 1103, the processor 502 may generate a content to be displayed through the second display by blending the at least one second surface image.

In operation 1105, the processor 502 may adjust the size of the generated content to the second size. For example, the processor 502 may adjust the size of the content to the second size through the scaler 507 such that the size of the generated content corresponds to the size of the second display 506.

In operation 1107, the processor 502 may display the content, of which the size has been adjusted to the second size, through the second display 506. For example, as illustrated in FIG. 8, the processor 502 may display the content, of which the size has been adjusted to the second size 809, through the second display 803.

According to various embodiments, the electronic device 501 may generate a content by blending at least one second surface image having a third size distinguished from the second size of the second display 506, and may perform an operation of adjusting the size of the generated content, so that the scaler 507 may perform a size adjustment operation regardless of the number of second surface images. Accordingly, power consumption of the electronic device 501 may be reduced compared to that in the case where the processor 502 is used for the size adjustment operation.

Figure 12:
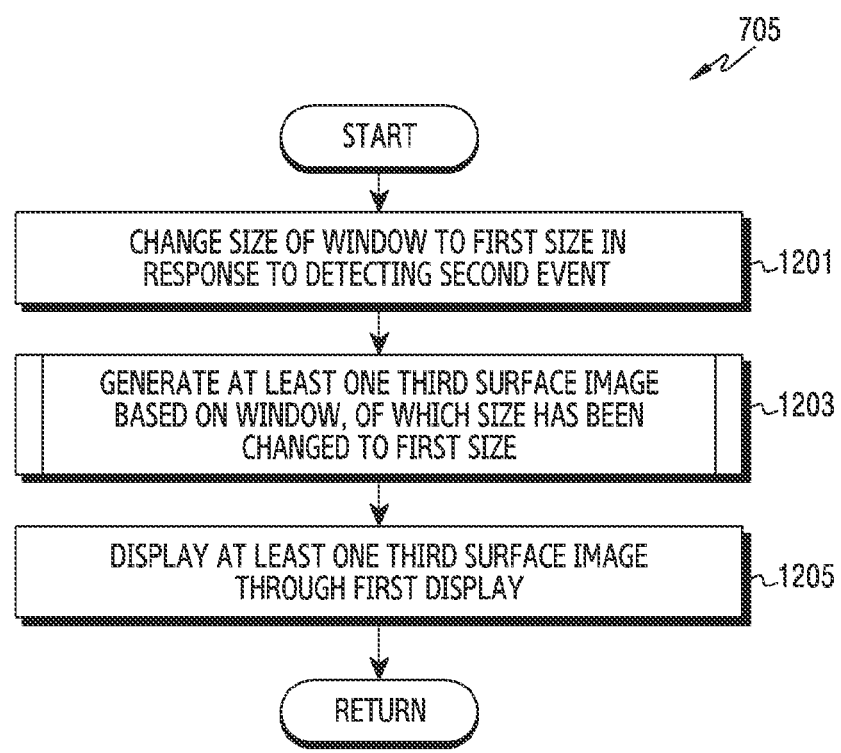
FIG. 12 is a flowchart illustrating another example method of displaying contents in an electronic device according to various embodiments.
Figure 13:
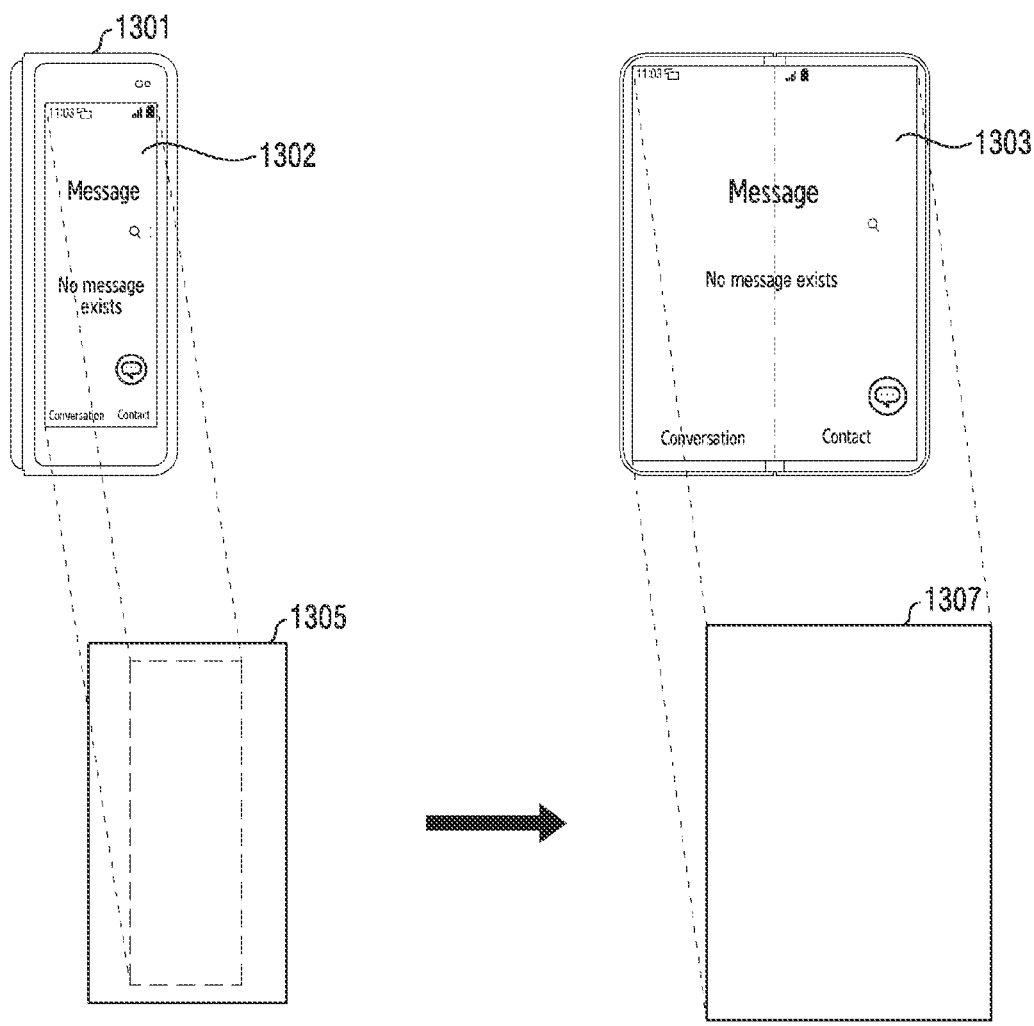
FIG. 13 is an diagram illustrating another example method of displaying contents in an electronic device according to various embodiments.

FIG. 12 is a flowchart illustrating another example method of displaying contents in an electronic device according to various embodiments. FIG. 13 is a diagram illustrating another example method of displaying contents in an electronic device according to various embodiments. The following description may be related to operations performed after performing operation 705 in FIG. 7.

Referring to FIGS. 12 and 13, in operation 1201, a processor (e.g., the processor 420 in FIG. 4 or the processor 502 in FIG. 5) of an electronic device (e.g., the electronic device 10 in FIGS. 1, 2 and 3, the electronic device 401 in FIG. 4, or the electronic device 501 in FIG. 5) may change the size of the window to the first size in response to detecting a second event while at least one second surface image is being displayed through a second display (e.g., the sub-display 190 in FIGS. 1 and 2 or the second display 506 in FIG. 5). For example, as illustrated in FIG. 13, when detecting the second event while the at least one second surface image is displayed through the second display 1302, the processor 502 may change the size of the window from a third size 1305 to a first size 1307. According to an embodiment, when it is identified that the state of the electronic device 501 is switched from the folded state to the unfolded state based on information acquired from a sensor (e.g., the sensor module 476 in FIG. 4 or the sensor 504 in FIG. 5), the processor 502 may determine that the second event is detected.

In operation 1203, the processor 502 may generate at least one third surface image based on the window, of which the size has been changed to the first size. According to an embodiment, the at least one third surface image may be generated based on the same application as the at least one second surface image.

In operation 1205, the processor 502 may display the at least one third surface image through the first display 505. According to an embodiment, the processor 502 may generate a content by blending the at least one third surface image to be displayed through the first display 505, and may display the generated content through the first display 505. According to an embodiment, the content displayed through the first display 505 may be associated with a content, which has been displayed through the second display.

According to various embodiments, when the electronic device 1301 detects the second event in the state of including the first display 1303 and the second display 1302 having different pixel densities, the electronic device 1301 may continuously display a content associated with the content, which is being displayed through the second display 1302, through the first display 506 by performing operations 701 to 705. Accordingly, the electronic device 1301 may provide the user with a continuous application environment.

According to various embodiments, a method of displaying a content on an electronic device is provided, the electronic device including: a foldable housing including: a hinge, a first housing connected to the hinge, and including a first face oriented in a first direction, and a second face oriented in a second direction opposite the first direction, and a second housing connected to the hinge and including a third face oriented in a third direction, and a fourth face oriented in a fourth direction opposite the third direction, the second housing configured to be folded with the first housing about the hinge, wherein, in a folded state, the first face faces the third face, and in a fully unfolded state, the third direction is the same as the first direction; at least one sensor (e.g., the sensor module 476 in FIG. 4 or the sensor 504 in FIG. 5) disposed inside the foldable housing; a first display (e.g., the display 100 in FIG. 1 or the first display 505 in FIG. 5) extending from the first face to the third face defining the first face and the third face, the first display having a first size and a first pixel density; a second display (e.g., the sub-display 190 in FIGS. 1 and 2 or the second display 506 in FIG. 5) defining the second face, the second display having a second size different from the first size and a second pixel density different from the first pixel density; a processor (e.g. the processor 420 in FIG. 4 or the processor 502 in FIG. 5) disposed inside the first housing or the second housing, and operatively connected to the at least one sensor, the first display, and the second display; and a memory (e.g., the memory 430 in FIG. 4 or the memory 503 in FIG. 5) operatively connected to the processor. The method may include: displaying at least one first surface image generated based on the window having the first size through the first display; changing the size of the window to a third size different from the first size and the second size based on information associated with the first display and information associated with the second display in response to detecting a first event through the at least one sensor based on the at least one first surface image being displayed through the first display; and displaying at least one second surface image generated based on the window, of which the size has been changed to the third size, through the second display.

According to various example embodiments, the method of displaying the content on the electronic device may further include detecting the first event based on identifying that the foldable housing is switched from the unfolded state into the folded state based on information acquired from the at least one sensor.

According to various example embodiments, the displaying the at least one second surface image through the second display may include generating the at least one second surface image based on the window, of which the size has been changed to the third size adjusting the size of the at least one second surface image to the second size of the second display such that the size of the at least one second surface image corresponds to the second size of the second display; generating a content by blending the at least one second surface image, of which the size has been adjusted to the second size; and displaying the generated content through the second display.

According to various example embodiments, the electronic device may further include a scaler (e.g., the scaler 507 in FIG. 1), and the adjusting the size of the at least one second surface image to the second size may include adjusting the size of the at least one second surface image together with the scaler based on the number of second surface images exceeding a threshold, and adjusting the size of the at least one second surface image through the scaler based on the number of second surface images being equal to or less than the threshold.

According to various example embodiments, the third size may be smaller than the first size and the third size may be larger than the second size, and the adjusting of the size of the at least one second surface image to the second size may include performing down-scaling on the at least one second surface image such that the at least one second surface image is capable of having the second size.

According to various example embodiments, the adjusting the size of the at least one second surface image to the second size may include: generating the at least one second surface image based on the window, of which the size has been changed to the third size, generating a content by blending the at least one second surface image, adjusting the size of the generated content to the second size of the second display, and displaying the content, of which the size has been adjusted to the second size, through the second display.

According to various example embodiments, the third size may be smaller than the first size and the third size may be larger than the second size, and the adjusting the size of the generated content to the second size may include a performing down-scaling on the generated content such that the generated content is capable of having the second size.

According to various example embodiments, the at least one first surface image and the at least one second surface image may be images generated through the same application.

According to various example embodiments, the method of displaying the content on the electronic device may further include changing the size of the window, of which the size has been changed to the third size, to the first size in response to detecting a second event based on the at least one second surface image being displayed through the second display; generating at least one third surface image based on the window, of which the size has been changed to the first size, and displaying the at least one third surface image through the first display.

The method of displaying the content on the electronic device may further include detecting the second event based on identifying that the foldable housing is switched from the folded state into the unfolded state based on information acquired from the at least one sensor.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 440) including one or more instructions that are stored in a storage medium (e.g., internal memory 436 or external memory 438) that is readable by a machine (e.g., the electronic device 401). For example, a processor (e.g., the processor 420) of the machine (e.g., the electronic device 401) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. One of ordinary skill in the art will understand that various changes in form and detail may be made without departing from the spirit and scope of the disclosure, including the appended claims and their equivalents.

What is claimed is:
1. A portable communication device comprising:
a foldable housing including a first housing and a second housing;
a first display supporting a first resolution and a first pixel density, the first display accommodated in the first housing and the second housing such that, when the foldable housing is unfolded, the first display is visible through an area of a first surface of the portable communication device, and that, when the foldable housing is folded, a portion of the first display is folded according to a folding degree of the foldable housing;
a second display supporting a second resolution different from the first resolution and a second pixel density different from the first pixel density, the second display accommodated in the second housing, and not in the first housing, such that the second display is visible through at least one portion of a second surface of the portable communication device opposed to the first surface regardless of a folding state of the foldable housing;
a sensor configured to detect a change in the folding state of the foldable housing; and
a processor configured to:
while the foldable housing is unfolded, execute a specified application;
generate a first execution screen of the specified application in a first screen size corresponding to the first resolution;
display, via the first display set in the first resolution and the first pixel density, the first execution screen in the first screen size corresponding to the first resolution;
while the first execution screen is displayed, identify, using the sensor, the change in the folding state of the foldable housing from being unfolded to being folded;
based at least in part on the change in the folding state from being unfolded to being folded, generate a second execution screen of the specified application in a second screen size corresponding to a third resolution smaller than the first resolution and greater than the second resolution by a specified ratio; and
display, via the second display set in the second resolution and the second pixel density, the second execution screen in the second screen size corresponding to the third resolution.

2. The portable communication device of claim 1, wherein the processor is configured to:
perform the generating of the second execution screen such that the specified ratio corresponds to a ratio between the first pixel density and the second pixel density.

3. The portable communication device of claim 1, wherein the processor is configured to:
as at least part of the displaying of the second execution screen, adjust a size of the second execution screen from the second screen size to a third screen size corresponding to the second resolution.

4. The portable communication device of claim 1, wherein the processor is configured to:
as at least a part of the displaying of the second execution screen, down-scaling the second execution screen to meet the specified ratio.

5. The portable communication device of claim 1, wherein the processor is configured to:
generate the first execution screen and the second execution screen such that the first execution screen and the second execution screen include same content corresponding to the specified application.

6. The portable communication device of claim 1, wherein the processor is configured to:
generate the first execution screen as a first window of the first screen size corresponding to a first horizontal value and a first vertical value of the first resolution; and
generate the second execution screen as a second window of the second screen size different from a second horizontal value or a second vertical value of the second resolution.

7. The portable communication device of claim 1, wherein the processor is configured to:
while the second execution screen is displayed via the second display, identify, using the sensor, the change in the folding state of the foldable housing from being folded to being unfolded,
based at least in part on the change in the folding state from being folded to being unfolded, generate a third execution screen of the specified application in the first screen size corresponding to the first resolution, and
display, via the first display set in the first resolution and the first pixel density, the third execution screen.

8. The portable communication device of claim 1, wherein the processor is configured to:
as at least part of the displaying of the second execution screen, adjust a size of the second execution screen from the second screen size to a third screen size corresponding to the second resolution,
generate a content by blending the second execution screen, of which the size has been adjusted to the third screen size corresponding to the second resolution, and
display, via the second display, the generated content.

9. The portable communication device of claim 1, wherein the processor is configured to:
as at least part of the displaying of the second execution screen, generate a content by blending the second execution screen,
adjust a size of the generated content to a size corresponding to the second resolution, and
display, via the second display, the generated content, of which the size has been adjusted to the size corresponding to the second resolution.

10. The portable communication device of claim 9, wherein the size is smaller than the first screen size and larger than the second screen size, and
wherein the processor is configured to down-scaling the generated content such that the generated content is capable of having the second screen size.

11. A portable communication device comprising:
a foldable housing including a first housing and a second housing;
a first display supporting a first resolution and a first pixel density, the first display accommodated in the first housing and the second housing such that, when the foldable housing is unfolded, the first display is visible through an area of a first surface of the portable communication device, and that, when the foldable housing is folded, a portion of the first display is folded according to a folding degree of the foldable housing;
a second display supporting a second resolution different from the first resolution and a second pixel density different from the first pixel density, the second display accommodated in the second housing, and not in the first housing, such that the second display is visible through at least one portion of a second surface of the portable communication device opposed to the first surface regardless of a folding state of the foldable housing;
a sensor configured to detect a change in the folding state of the foldable housing; and a processor configured to:
    while the foldable housing is unfolded, execute a specified application such that a first execution screen of the specified application is displayed via the first display in a first screen size corresponding to the first resolution;
    while the first execution screen is displayed, identify, using the sensor, the change in the folding state of the foldable housing from being unfolded to being folded; and
    based at least in part on the change in the folding state from being unfolded to being folded, display, via the second display, a second execution screen of the specified application in a second screen size corresponding to a third resolution smaller than the first resolution and greater than the second resolution by a specified ratio.

12. The portable communication device of claim 11, wherein the processor is configured to:
    perform the displaying of the second execution screen such that the specified ratio corresponds to a ratio between the first pixel density and the second pixel density.

13. The portable communication device of claim 11, wherein the processor is configured to:
    as at least part of the displaying of the second execution screen, adjust a size of the second execution screen from the second screen size to a third screen size corresponding to the second resolution and smaller than the second screen size by the specified ratio.

14. The portable communication device of claim 11, wherein the processor is configured to:
    as at least a part of the displaying of the second execution screen, down-scaling the second execution screen to meet the specified ratio.

15. The portable communication device of claim 11, wherein the processor is configured to:
    generate the first execution screen and the second execution screen such that the first execution screen and the second execution screen include same content corresponding to the specified application.

16. The portable communication device of claim 11, wherein the processor is configured to:
    generate the first execution screen as a first window of the first screen size corresponding to a first horizontal value and a first vertical value of the first resolution; and
    generate the second execution screen as a second window of the second screen size substantially different from a second horizontal value or a second vertical value of the second resolution.

17. The portable communication device of claim 11, wherein the processor is further configured to:
    while the second execution screen is displayed via the second display, identify, using the sensor, the change in the folding state of the foldable housing from being folded to being unfolded,
    based at least in part on the change in the folding state from being folded to being unfolded, display, via the first display, a third execution screen of the specified application in the first screen size corresponding to the first resolution.

18. The portable communication device of claim 11, wherein the processor is configured to:
    as at least part of the displaying of the second execution screen, adjust a size of the second execution screen from the second screen size to a third screen size corresponding to the second resolution,
    generate a content by blending the second execution screen, of which the size has been adjusted to the third screen size corresponding to the second resolution, and
    display, via the second display, the generated content.

19. The portable communication device of claim 11, wherein the processor is configured to:
    as at least part of the displaying of the second execution screen, generate a content by blending the second execution screen,
    adjust a size of the generated content to a size corresponding to the second resolution, and
    display, via the second display, the generated content, of which the size has been adjusted to the size corresponding to the second resolution.

20. The portable communication device of claim 19, wherein the size is smaller than the first screen size and larger than the second screen size, and
    wherein the processor is configured to down-scaling the generated content such that the generated content is capable of having the second screen size.

* * * * *